US008902162B2

(12) United States Patent
Matsumoto et al.

(10) Patent No.: US 8,902,162 B2
(45) Date of Patent: Dec. 2, 2014

(54) IMAGE DISPLAY APPARATUS

(75) Inventors: Kazumi Matsumoto, Tokyo (JP); Isshu Nakajima, Tokyo (JP); Tatsuya Tokunaga, Tokyo (JP); Takeshi Hoshino, Kodaira (JP); Takashi Matsubara, Chigasaki (JP); Setiawan Bondan, Yamato (JP); Takahiko Nozoe, Yokohama (JP)

(73) Assignee: Hitachi Maxell, Ltd., Osaka (JP)

(*) Notice: Subject to any disclaimer, the term of this patent is extended or adjusted under 35 U.S.C. 154(b) by 324 days.

(21) Appl. No.: 13/338,104

(22) Filed: Dec. 27, 2011

(65) Prior Publication Data
US 2012/0249423 A1  Oct. 4, 2012

(30) Foreign Application Priority Data

Mar. 31, 2011 (JP) ................................ 2011-079316

(51) Int. Cl.
G06F 3/033  (2013.01)
G09G 5/08  (2006.01)
G06F 3/0488  (2013.01)
G09F 27/00  (2006.01)
G06F 1/16  (2006.01)
G06F 3/042  (2006.01)
G09F 9/30  (2006.01)

(52) U.S. Cl.
CPC ............. *G06F 1/16* (2013.01); *G06F 3/04886* (2013.01); *G09F 27/005* (2013.01); *G06F 3/0425* (2013.01); *G09F 9/30* (2013.01); *G09F 27/00* (2013.01)

USPC ........ 345/158; 345/157; 345/174; 705/14.37; 705/411

(58) Field of Classification Search
USPC ................................ 345/158; 705/14.37, 411
See application file for complete search history.

(56) References Cited

U.S. PATENT DOCUMENTS

| 2004/0139038 A1* | 7/2004 | Ehlers et al. ................... 705/412 |
| 2005/0110780 A1* | 5/2005 | Ditzik ............................ 345/179 |
| 2005/0268252 A1* | 12/2005 | Parker et al. ................... 715/810 |
| 2006/0136246 A1* | 6/2006 | Tu .................................... 705/1 |

(Continued)

FOREIGN PATENT DOCUMENTS

| JP | 4318056 | 8/2009 |
| JP | 2010-15553 | 1/2010 |

*Primary Examiner* — Gerald Johnson
(74) *Attorney, Agent, or Firm* — Stephen J. Weyer, Esq.; Nicholas B. Trenkle, Esq.; Stites & Harbison, PLLC.

(57) ABSTRACT

A screen is provided on a housing in such a manner that the screen protrudes toward its nearer side, and is inclined so that the nearer side becomes lower. This screen displays thereon a first hierarchy menu for indicating an arrangement of genre pictures, a second hierarchy menu for indicating an arrangement of commodity pictures, and a map image for indicating a map of the sales counters. A user brings his or her hand tip nearer to this screen. This operation allows a double-ring pointer to be displayed at a position which corresponds to the spatial position or direction of the user's hand tip relative to the screen. On this screen, the user is permitted to change the position of this double-ring pointer by performing a gesture of changing the spatial position or direction of the user's hand tip.

9 Claims, 27 Drawing Sheets

(56) References Cited

U.S. PATENT DOCUMENTS

| | | | |
|---|---|---|---|
| 2009/0171798 A1* | 7/2009 | Sasaki et al. | 705/17 |
| 2009/0267921 A1* | 10/2009 | Pryor | 345/177 |
| 2010/0079677 A1 | 4/2010 | Matsubara et al. | |
| 2010/0083180 A1 | 4/2010 | Matsubara et al. | |
| 2010/0275159 A1 | 10/2010 | Matsubara et al. | |
| 2011/0080337 A1 | 4/2011 | Matsubara et al. | |
| 2011/0083112 A1 | 4/2011 | Matsubara et al. | |
| 2011/0141009 A1 | 6/2011 | Izumi | |
| 2011/0267265 A1* | 11/2011 | Stinson | 345/157 |
| 2012/0056849 A1* | 3/2012 | Kasahara et al. | 345/174 |

* cited by examiner

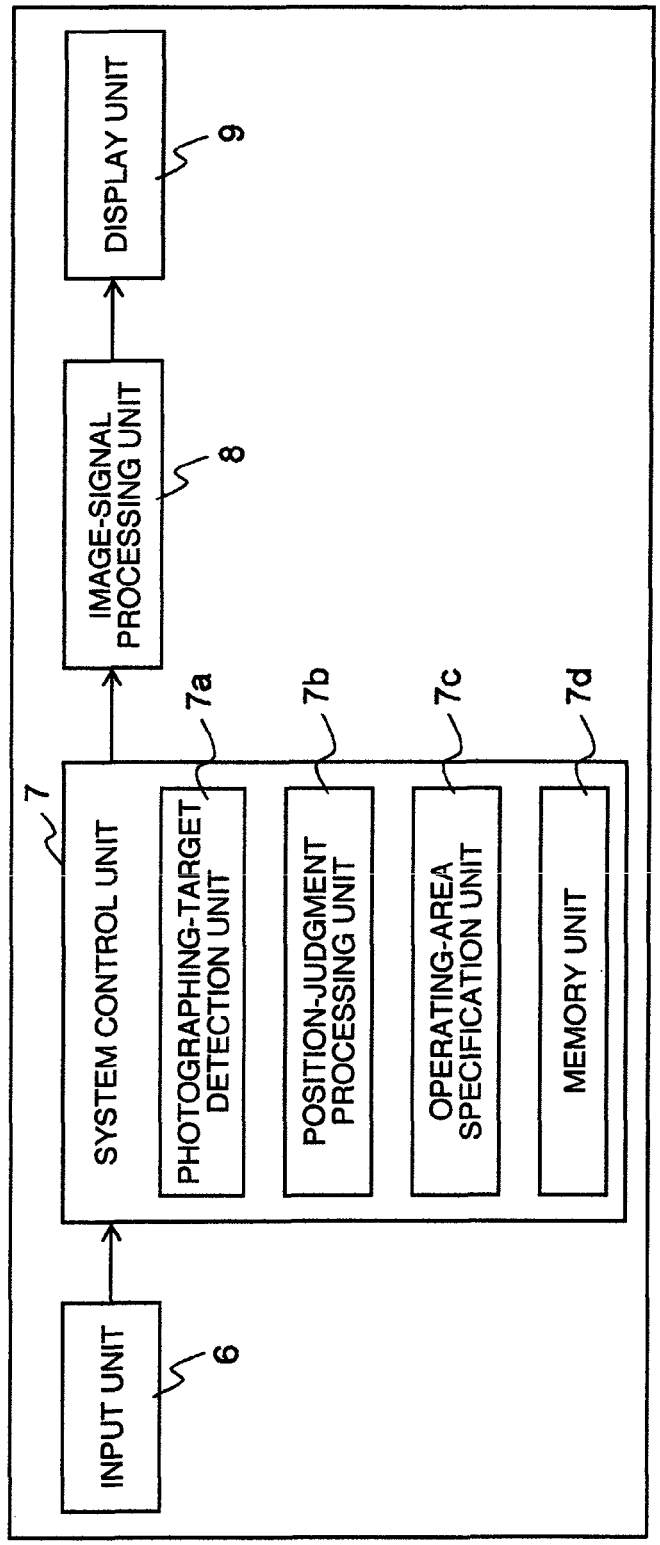

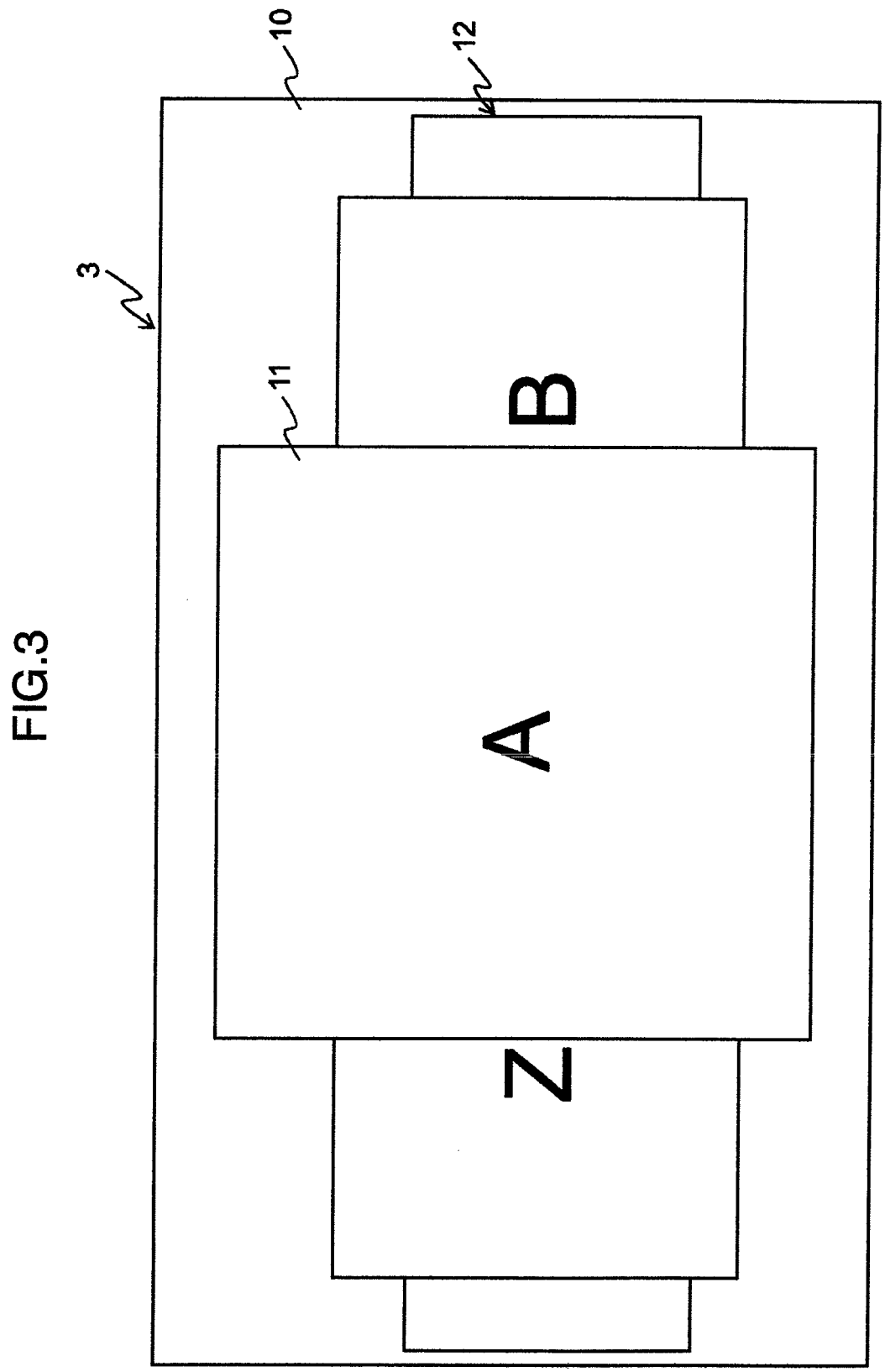

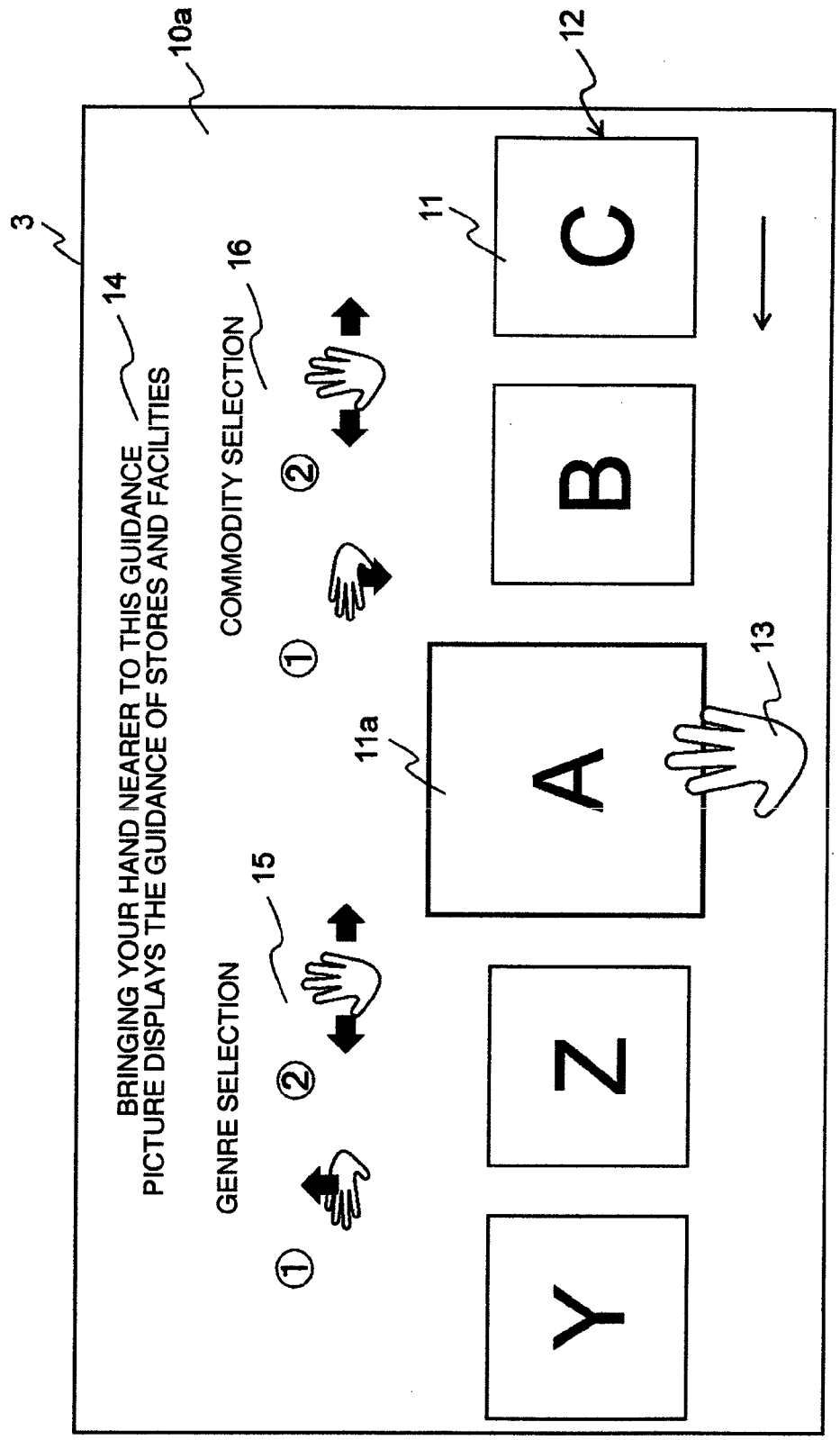

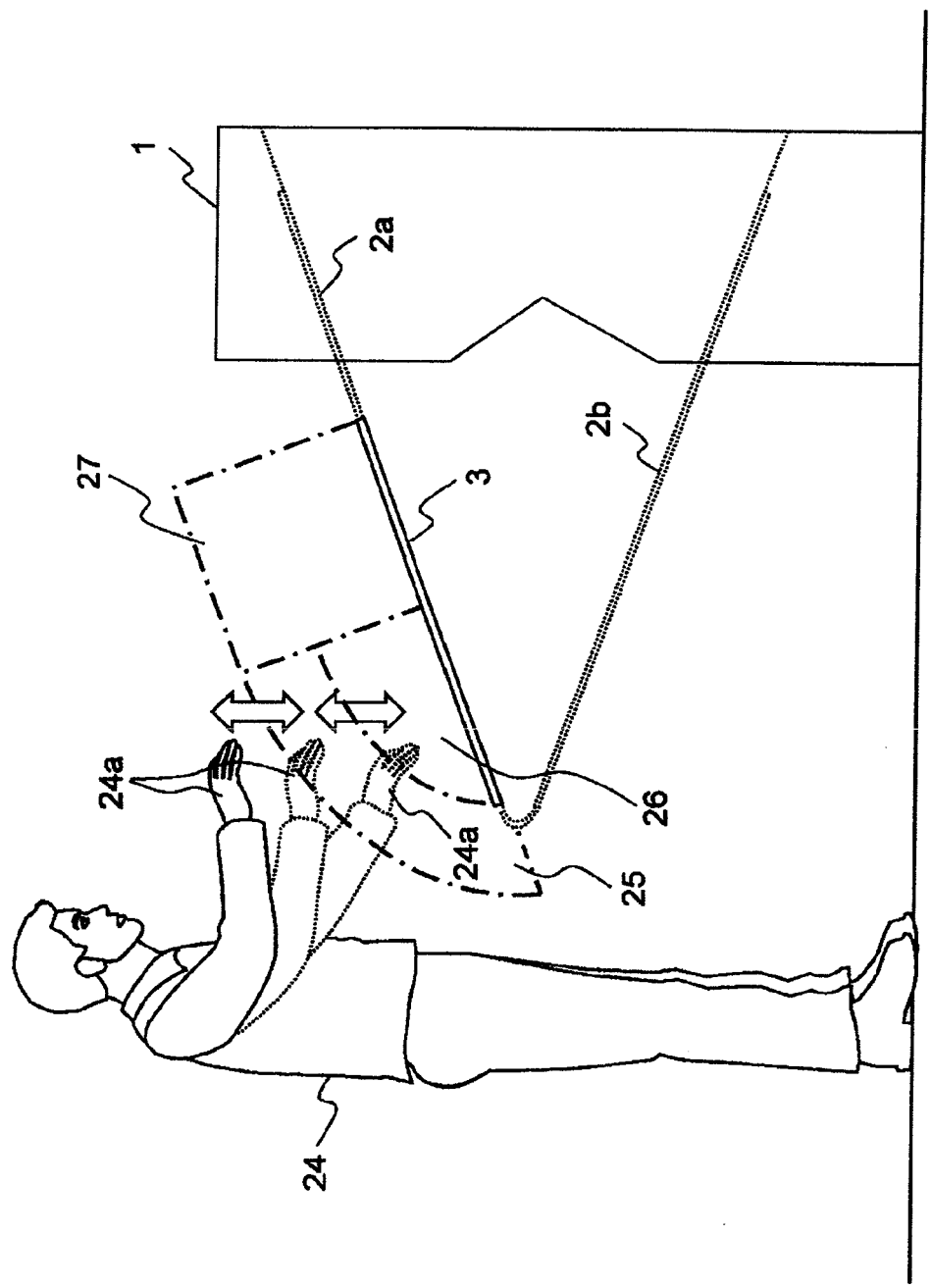

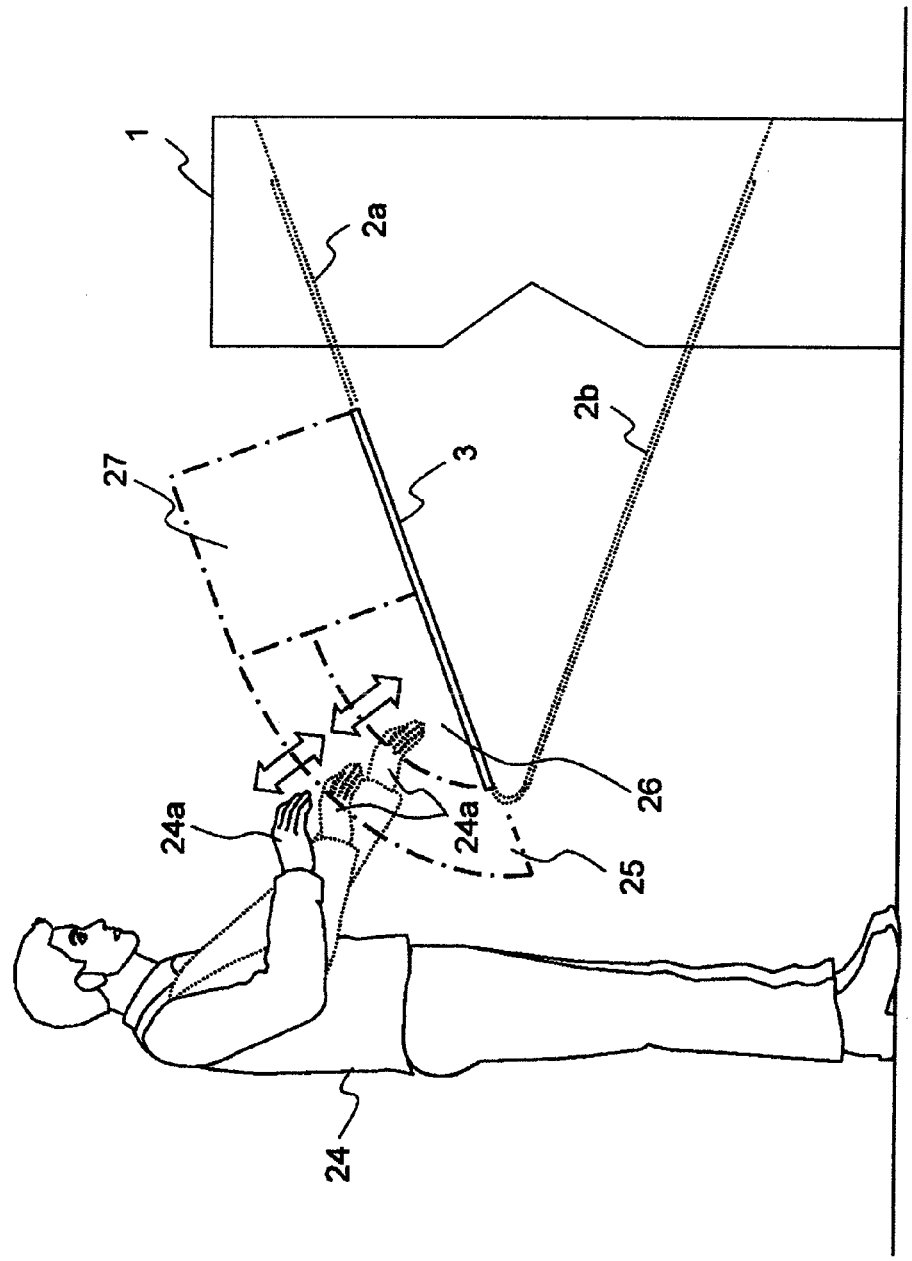

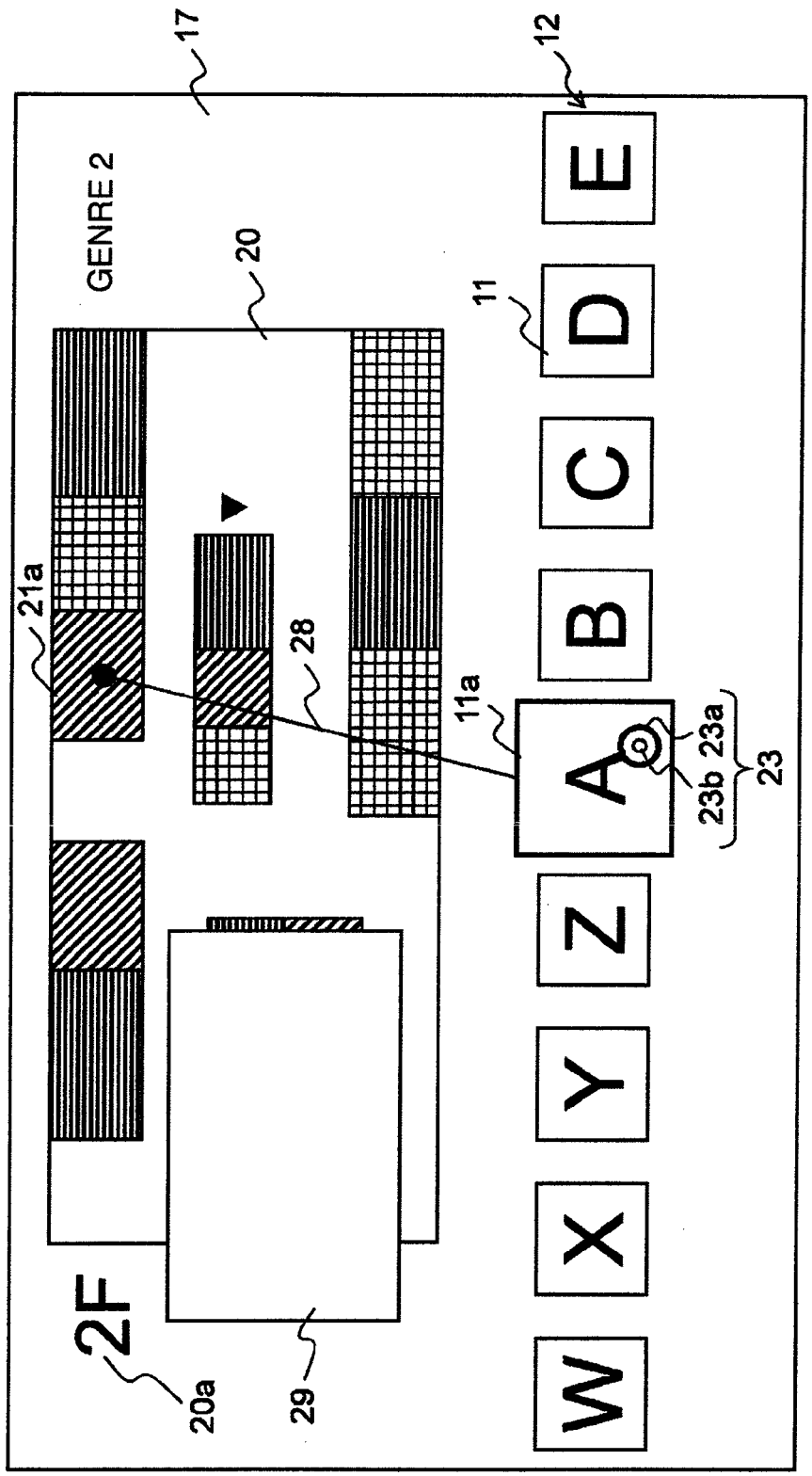

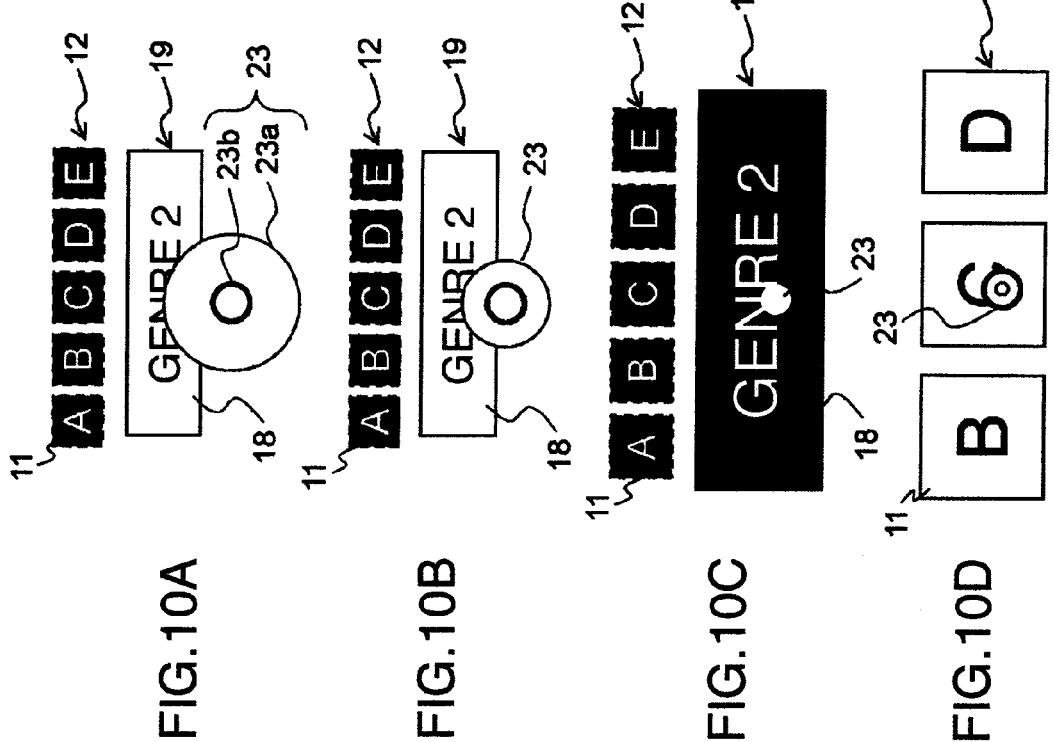
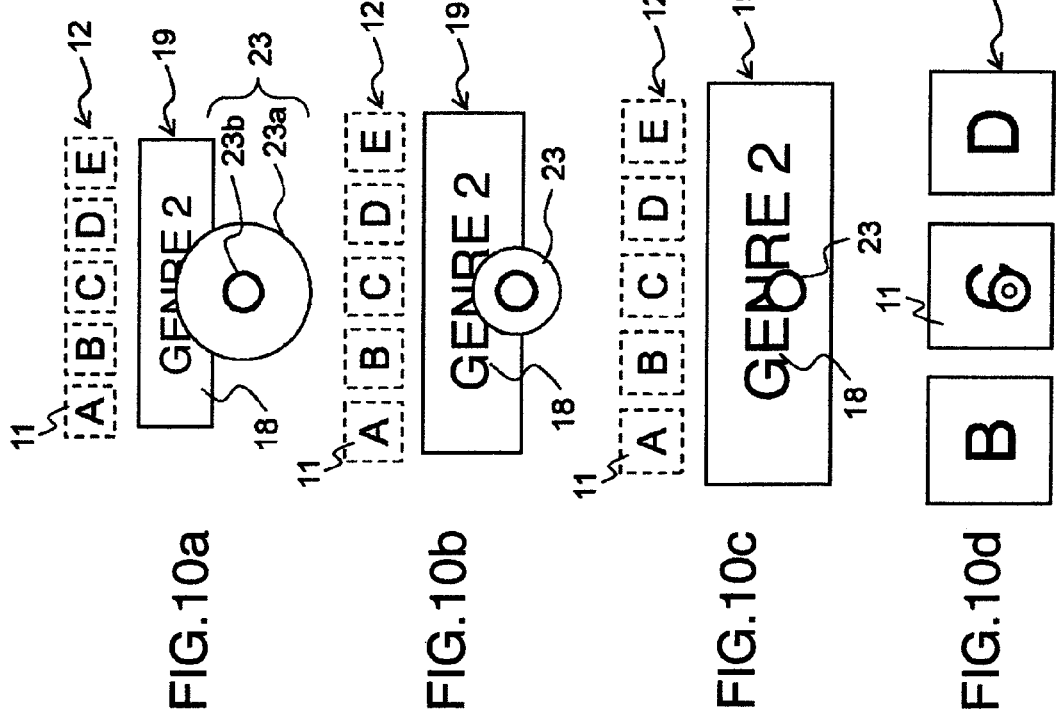

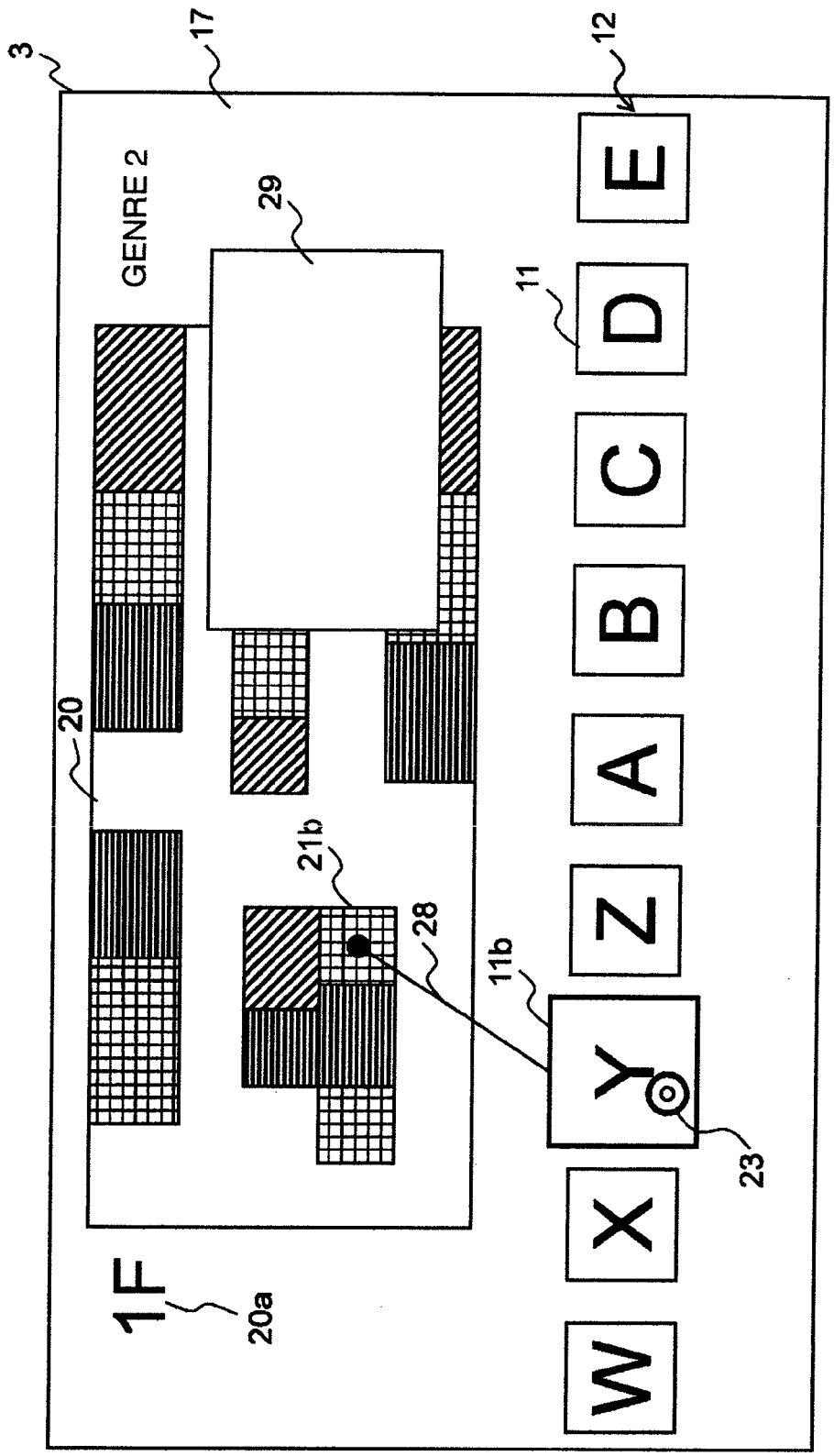

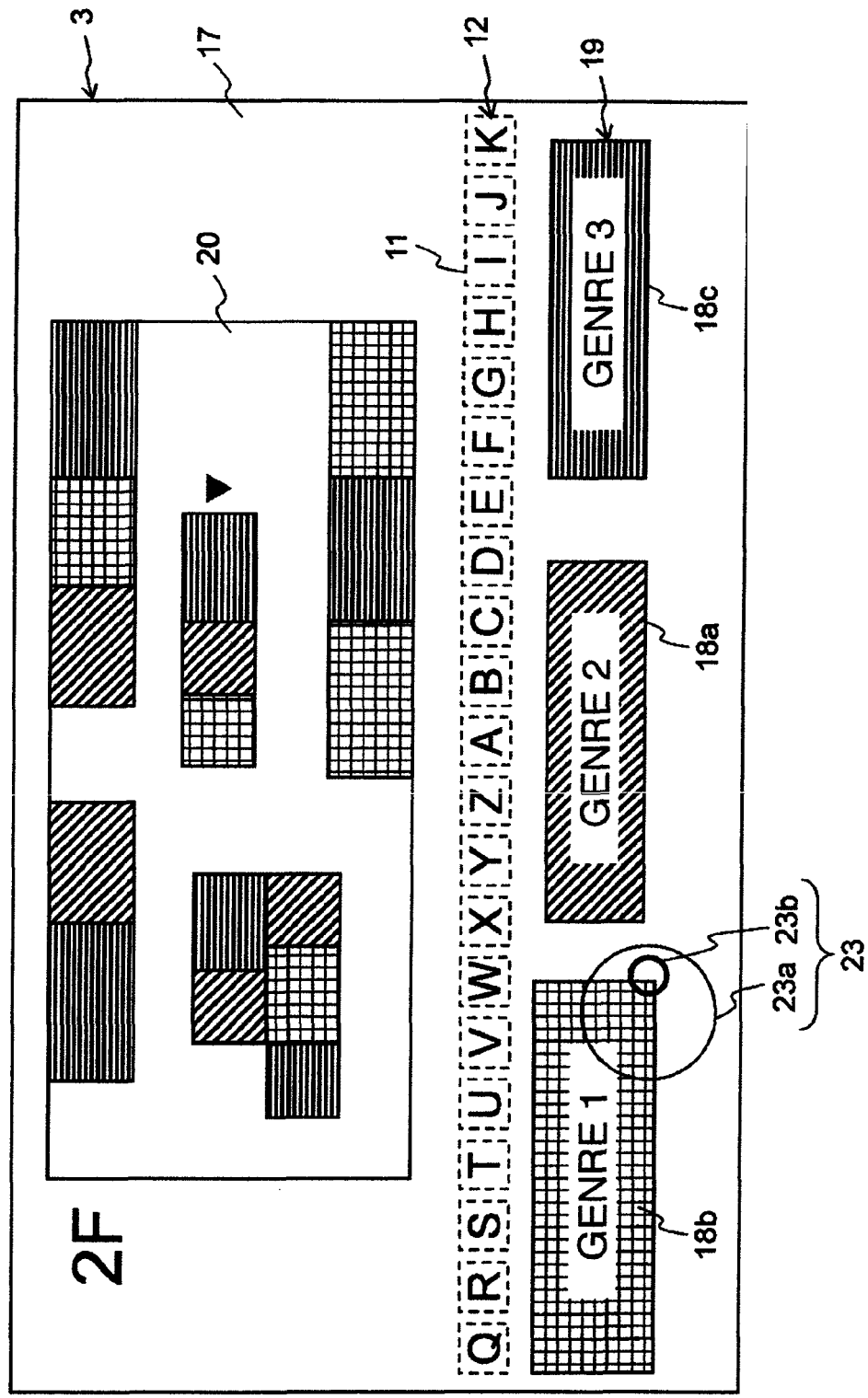

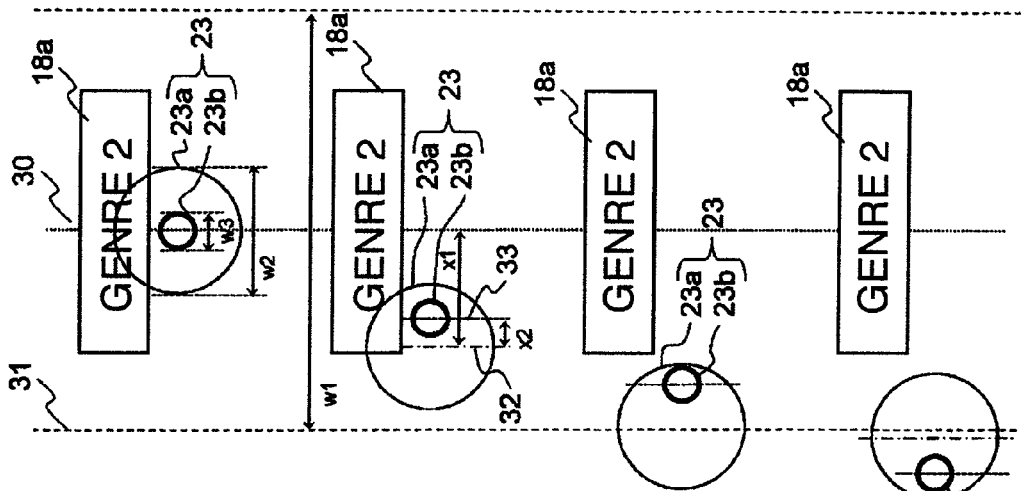

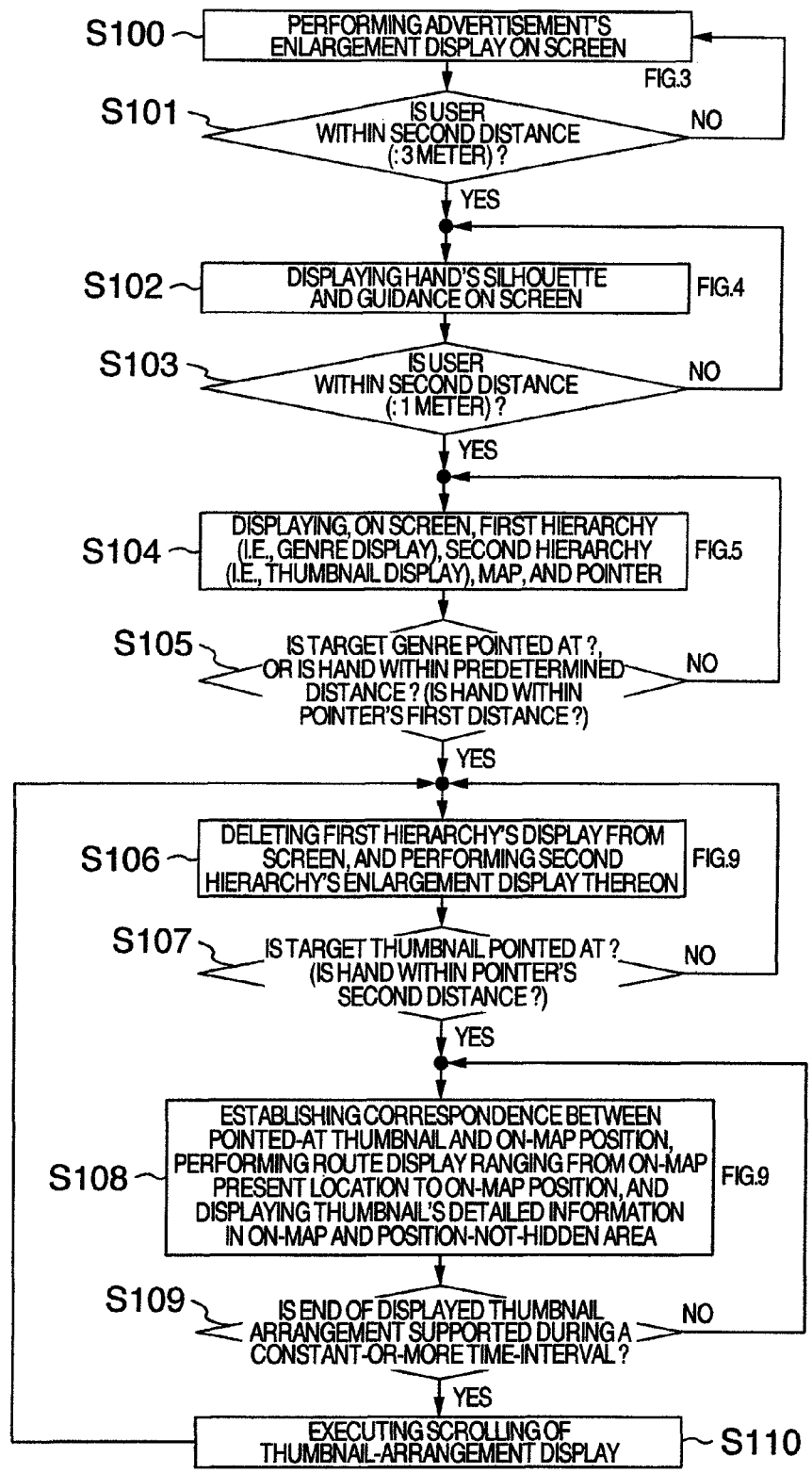

IMAGE DISPLAY APPARATUS

INCORPORATION BY REFERENCE

The present application claims priority from Japanese application JP2011-079316 filed on Mar. 31, 2011, the content of which is hereby incorporated by reference into this application.

BACKGROUND OF THE INVENTION

The present invention relates to an image display apparatus. More particularly, it relates to an image display apparatus which is so designed as to be able to display the images of respective types of commodities, and to guide customers around the sales shops (or, sales counters) of these commodities.

In commercial facilities including a lot of sales counters, such as department store, large-sized store, shopping mall, and restaurant district, respective types of commodities, such as dish, its ingredients, clothing, and ornament, are on sale. Moreover, an advertisement/guidance sign or something like that, which is intended to let customers know such information as the types of these commodities and their sales locations (i.e., sales counters), is set up at the entrance of a large-sized store, or at its each floor's predetermined location. This set up of the advertisement/guidance sign permits a customer to know whether or not a commodity, which this customer takes an interest in or wishes to buy, is on sale at present. Also, the customer is permitted to know at which floor such a commodity is on sale.

A proposal has been made concerning the following system: Namely, in this system, an advertisement/guidance sign like this is made operable by the customers. Then, a customer operates this advertisement/guidance sign. This operation allows this customer to be provided with the guidance information that this customer wishes to know. Moreover, the method of operating this advertisement/guidance sign is as follows: Namely, a touch panel is provided, thereby allowing the customer to operate this advertisement/guidance sign by touching this sign directly. Another proposal, however, has been made concerning the following technology: Namely, in this technology, instead of directly operating the operating unit, the type of the operation is judged from a movement (i.e., gesture) of the customer's hand tip or finger tip. Furthermore, a processing corresponding to the judged operation is caused to be performed (Refer to, e.g., JP-A-2010-15553 (corresponding to U.S. Patent Publication No. 2011/141009)).

SUMMARY OF THE INVENTION

By the way, the above-described technology disclosed in JP-A-2010-15553 is as follows: Namely, in this technology, an operating plane is virtualized. Then, the user protrudes his or her hand tip or finger tip from this virtual operating plane, thereby performing a movement corresponding to the operation. In response thereto, the type of the operation is judged from this movement. Subsequently, the judged operation is displayed on a monitor, thereby prompting the user to confirm the judged operation. Simultaneously, a processing corresponding to the judged operation is caused to be performed. As a consequence, the user is required to watch the image displayed on this monitor, and to confirm whether or not the user is performing the gesture which allows implementation of the processing that the user has intended. This requirement results in a problem that the following burden is imposed on the user: Namely, the user must correct his or her own gesture while making the above-described confirmation.

Also, in the above-described technology disclosed in JP-A-2010-15553, the above-described virtual operating plane constitutes a vertical plane. As a consequence, the user is required to take a posture of lifting his or her hand. This requirement also results in a problem that the burden of this posture is imposed on the user's body.

It is an object of the present invention to solve these problems, and to provide the following image display apparatus: An image display apparatus which allows the user to confirm the result of his or her own gesture for an operation directly on the display screen, and which allows the operation's burden to be reduced by permitting the user to perform the gesture for the operation with an easy and relaxed posture.

In order to accomplish the above-described object, in the present invention, there is provided the following image display apparatus: An image display apparatus, including a housing on which a display unit is provided, an introduction picture for introducing commodities being displayed on a display screen of the display unit, wherein the display screen is provided in such a manner that the display screen protrudes toward its nearer side, and is inclined so that the nearer side becomes lower.

Also, in the present invention, the display screen is a screen onto which the introduction picture is projected by a projector, a sensor for detecting direction or position of hand tip of a user directed toward the screen being provided on the display screen.

Also, in the present invention, the introduction picture is so configured as to display thereon a first hierarchy menu, a second hierarchy menu, and a map image, the first hierarchy menu being a menu where genre pictures on each commodity-genre basis are displayed in a manner of being arranged, the second hierarchy menu being a menu where thumbnail-displayed commodity pictures are displayed in a manner of being arranged, the thumbnail-displayed commodity pictures indicating commodities on each commodity-genre basis in the first hierarchy menu, the map image being used for guiding the user around sales counters at which the commodities are on sale, the commodities being indicated by the commodity pictures in the second hierarchy menu, a pointer being displayed in any one of display areas of the first hierarchy and second hierarchy menus and display area of the map image in accordance with the sensor-detected detection position of the user's hand tip relative to the screen, so that any one of the genre pictures in the first hierarchy menu, the commodity pictures in the second hierarchy menu, and the sales counters on the map image can be pointed at by using the pointer.

Also, in the present invention, the pointer is positioned on the first hierarchy menu, when the sensor-detected detection position of the user's hand tip falls within a first distance range set in advance, the first hierarchy menu being deleted, and the second hierarchy menu being enlargement-displayed, and the pointer being positioned on the second hierarchy menu, when the sensor-detected detection position of the user's hand tip falls within a second distance range set in advance, the pointer being positioned on the map image, when the sensor-detected detection position of the user's hand tip falls within a third distance range set in advance.

Also, in the present invention, the commodity pictures in the second hierarchy menu are respectively displayed on the introduction picture in such a manner that the commodity pictures are respectively opposed to the genre picture of the genre to which the commodities belong, the introduction picture displaying thereon the first hierarchy menu, the second hierarchy menu, and the map image, the position of the pointer being fixed when the sensor-detected detection position of the user's hand tip displaces from the first distance range into the second distance range, the second hierarchy menu being then displayed in such a manner that the position-fixed pointer is positioned on the commodity picture in the second hierarchy menu, the commodity picture corresponding to the genre picture in the first hierarchy menu which has been displayed when the detection position falls within the first distance range.

Also, in the present invention, the commodity picture and the sales counter on the map image are displayed in a manner of being connected to each other by using a connection line, the commodity picture being pointed at by using the pointer in the second hierarchy menu, the commodity indicated by the commodity picture being on sale at the sales counter, the second hierarchy menu being displayed when the sensor-detected detection position of the user's hand tip falls within the second distance range.

Also, in the present invention, the first hierarchy menu is scrolled by positioning the pointer at an end portion of the arrangement of the genre pictures in the first hierarchy menu.

Also, in the present invention, the second hierarchy menu is scrolled by positioning the pointer at an end portion of the arrangement of the commodity pictures in the second hierarchy menu.

According to the present invention, the display surface is set up in an inclined manner so that its nearer side becomes lower. As a consequence, the user can perform the gesture for a desired operation with an easy and relaxed posture without lifting his or her hand up to a high position. Concretely, a picture for indicating an image as the operation target is displayed on the screen. The user performs the gesture for the desired operation toward this picture. Then, a pointer in response to this gesture is displayed. Accordingly, the user can confirm the result of his or her own gesture directly on the picture for indicating the image as the operation target. Consequently, the user can perform the gesture for the desired operation with the easy and relaxed posture.

Other objects, features and advantages of the invention will become apparent from the following description of the embodiments of the invention taken in conjunction with the accompanying drawings.

BRIEF DESCRIPTION OF THE DRAWINGS

FIG. 2 is a system configuration diagram for illustrating a concrete example of the processing unit provided inside the housing in the embodiment illustrated in FIG. 1A to FIG. 1G;

FIG. 3 is a diagram for illustrating a concrete example of an advertisement picture as the initial picture to be displayed on a transparent screen;

FIG. 4 is a diagram for illustrating a concrete example of an operation guidance picture to be displayed on the transparent screen;

FIG. 8A is a diagram for illustrating a concrete example of the movement of the user at the time when the user displaces his or her hand tip into a second distance area through the first distance area in a directly-below direction;

FIG. 8B is a diagram for illustrating a concrete example of the movement of the user at the time when the user displaces his or her hand tip into the second distance area through the first distance area in an obliquely-below direction;

FIG. 9 is a diagram for illustrating a concrete example of the introduction picture at the time when the double-ring pointer displaces from the first hierarchy menu in FIG. 7 to a second hierarchy menu;

FIG. 10a to FIG. 10d and FIG. 10A to FIG. 10D are diagrams for illustrating changes in the double-ring pointer which accompany the displacements of the user's hand tip illustrated in FIG. 8A to FIG. 8C;

FIG. 11 is a diagram for illustrating a concrete example of the introduction picture at the time when the user's hand tip at the position illustrated in FIG. 9 displaces into another commodity picture within the second distance area;

FIG. 13B is a diagram for illustrating the state of the double-ring pointer at the time when the double-ring pointer has reached the next genre picture from the state illustrated in FIG. 13A;

FIG. 15A to FIG. 15D are diagrams for illustrating, in more detail, another concrete example of the changes in the state of the double-ring pointer illustrated in FIG. 13A and FIG. 13B;

FIG. 20 is a flowchart for illustrating processing steps of the picture display.

DESCRIPTION OF THE INVENTION

Figure 1A:
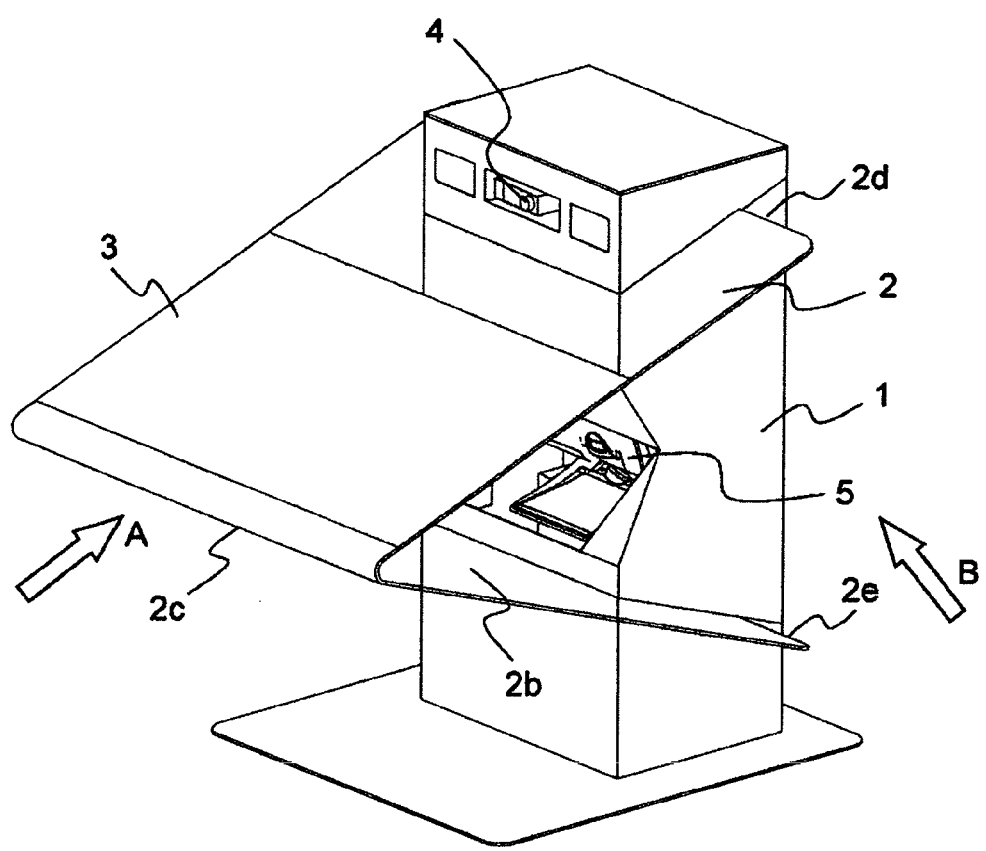
FIG. 1A is an outer-appearance perspective view for illustrating an embodiment of the image display apparatus according to the present invention.

Hereinafter, referring to the drawings, the explanation will be given below concerning embodiments of the present invention.

Figure 1B:
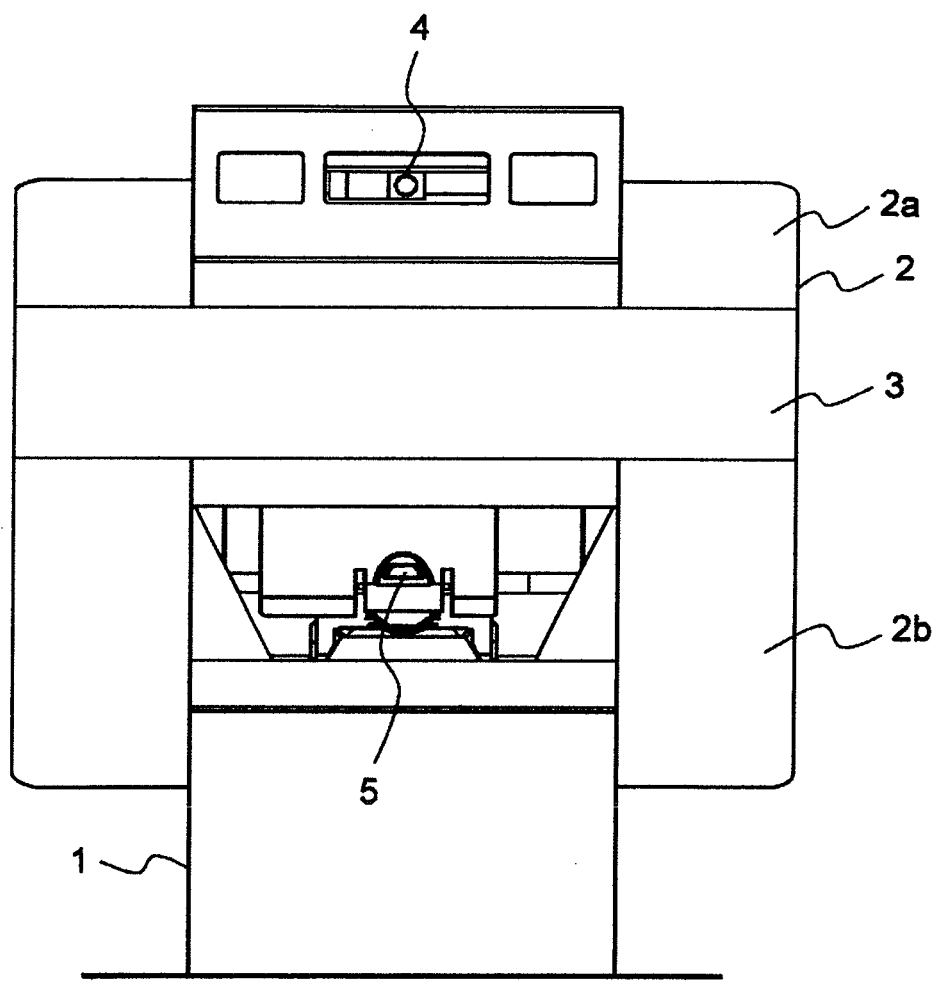
FIG. 1B is a front view of the embodiment seen from the side of an arrow A in FIG. 1A.
Figure 1C:
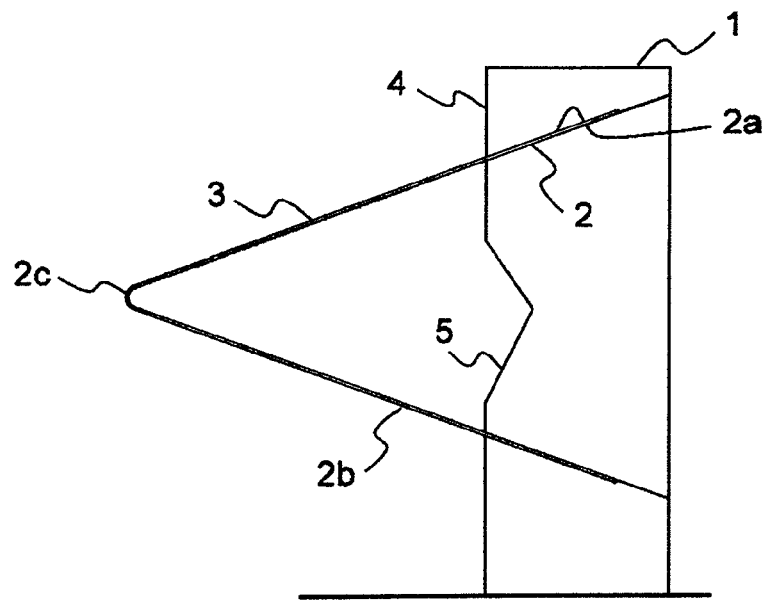
FIG. 1C is a right side view of the embodiment seen from the side of an arrow B in FIG. 1A.
Figure 1D:
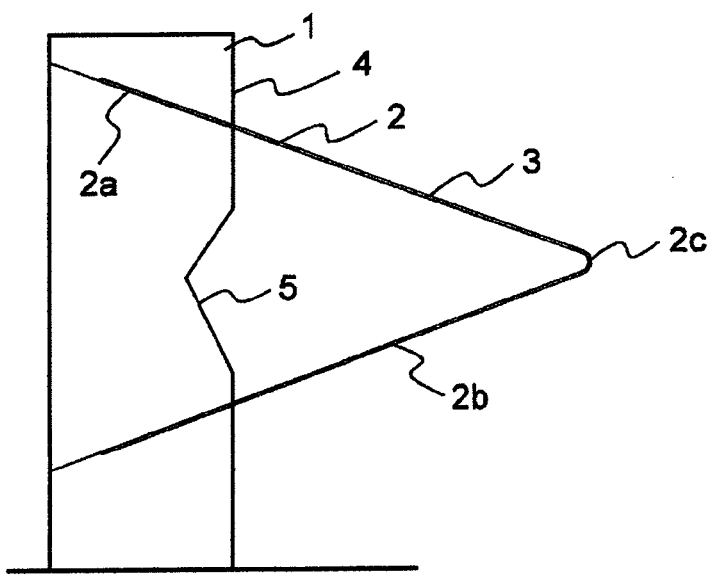
FIG. 1D is a left side view of the embodiment seen from the opposite side to the arrow B in FIG. 1A.
Figure 1E:
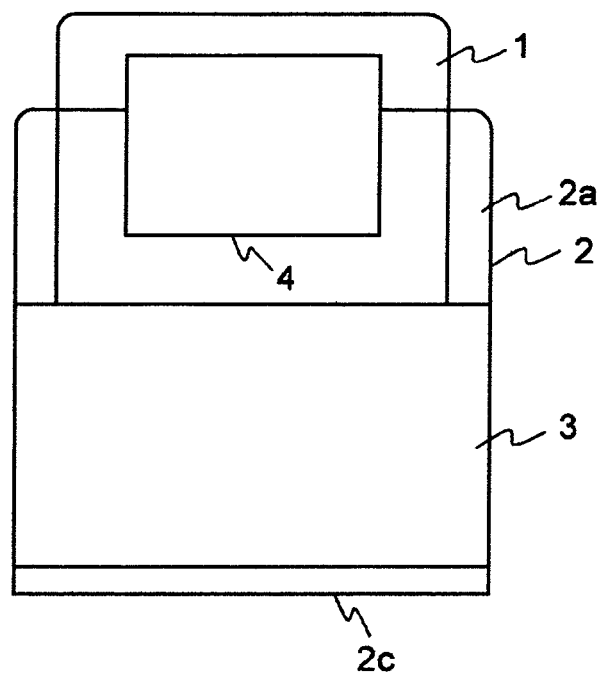
FIG. 1E is a top view of the embodiment seen from the upper side in FIG. 1A.
Figure 1F:
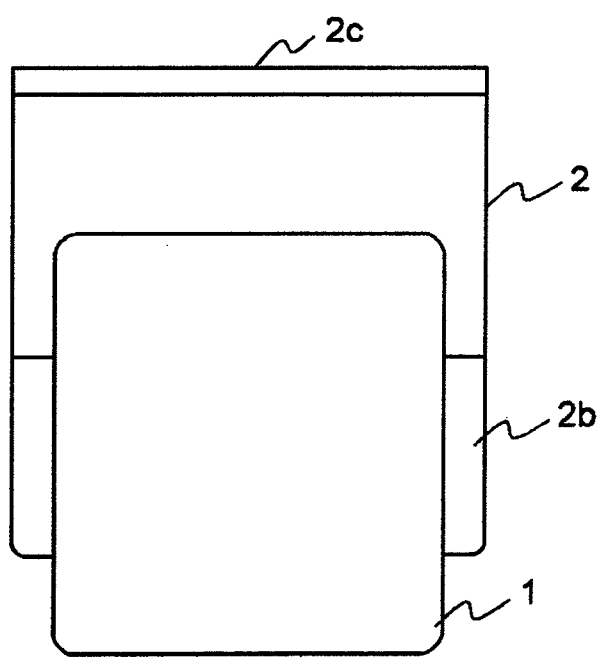
FIG. 1F is a bottom view of the embodiment seen from the bottom side in FIG. 1A.
Figure 1G:
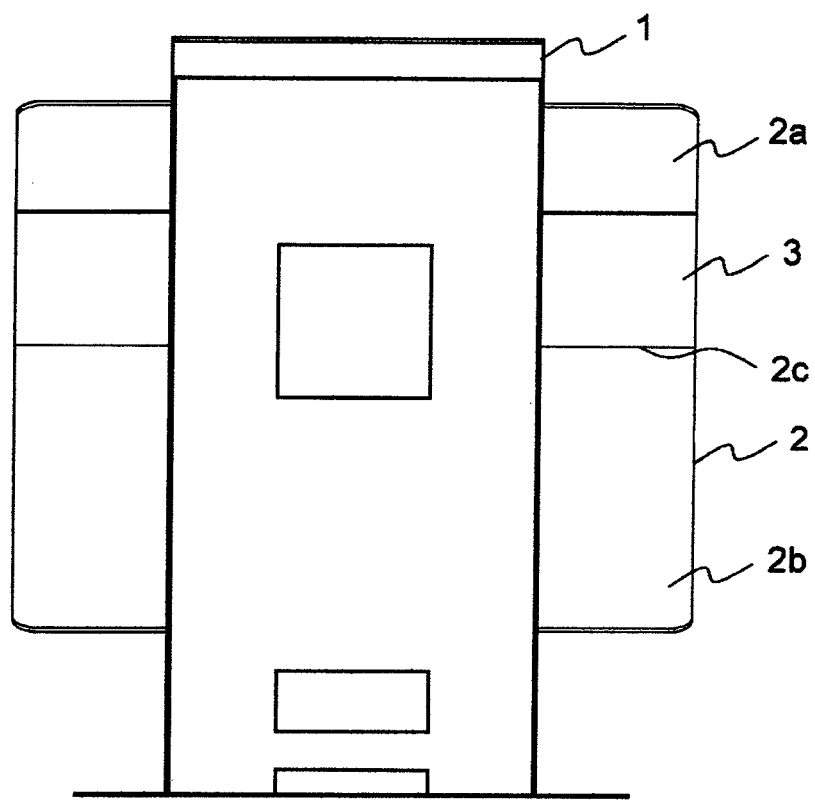
FIG. 1G is a back view of the embodiment seen from the back side in FIG. 1A.

FIG. 1A is an outer-appearance perspective view for illustrating an embodiment of the image display apparatus according to the present invention. FIG. 1B is a front view of the embodiment seen from the side of an arrow A in FIG. 1A. FIG. 1C is a right side view of the embodiment seen from the side of an arrow B in FIG. 1A. FIG. 1D is a left side view of the embodiment seen from the opposite side to the arrow B in FIG. 1A. FIG. 1E is a top view of the embodiment seen from the upper side in FIG. 1A. FIG. 1F is a bottom view of the embodiment seen from the bottom side in FIG. 1A. FIG. 1G is a back view of the embodiment seen from the back side in FIG. 1A. The reference numerals given here denote the following configuration components, respectively: 1 housing, 2 plate, 2a plate's upper-side portion, 2b plate's lower-side portion, 2c bent portion, 2d, 2e edge portions, 3 diffusion screen, 4 video camera, 5 projector.

On the above-described drawings, the thin-flat-plate-like plate 2, whose cross-sectional profile is a V-character-like-bent profile, is installed onto the housing 1 by being fixed thereto. Here, this fixing is performed such that the respective plate's edge portions 2d and 2e are inserted and engaged into the upper and lower portions of the housing 1. The plate's upper-side portion 2a is positioned between the plate'bent portion 2c and the plate's edge portion 2d installed onto the upper-portion side of the housing 1. Moreover, the plate's upper-side portion 2a is inclined in a descending manner with a predetermined inclination angle, and toward the nearer side when seen from the surface of the housing 1, i.e., in the direction opposite to the direction of the arrow A. Also, the plate's lower-side portion 2b is positioned between the plate'bent portion 2c and the plate's edge portion 2e installed onto the lower-portion side of the housing 1. Moreover, the plate's lower-side portion 2b is inclined in a descending manner with a predetermined inclination angle, and toward the deeper side, i.e., in the direction of the arrow A. The inclination angle of the plate's upper-side portion 2a like this is more or less a small angel, which is equal to, e.g., about 20°. The inclination angle and height of the upper-side portion like this makes it easier for a grown-up user to look at the upper-side portion when the user looks down on it, and also makes it easier to point at the upper-side portion with his or her finger tip. Namely, the profile of the plate's upper-side portion 2a is so designed as to become a shelf-like profile, which protrudes toward the nearer side from the housing 1, and which is incline in a descending manner and toward the nearer side.

Most of the plate's upper-side portion 2a constitutes the diffusion screen 3 such as a frosted glass. Also the projector 5, whose projection direction is set to the direction toward this diffusion screen 3, is provided between the installation locations of the plate's edge portions 2d and 2e onto the housing 1. A projection image based on this projector 5 is projected onto this diffusion screen 3.

Also, the camera 4 is provided on the upper side of the installation location of the plate's upper-side portion 2a onto the housing 1. This camera 4 functions as a three-dimensional sensor for performing a three-dimensional photographing (i.e., for allowing the detection of a position in the deeper direction as well). This camera 4 photographs an upper-side space over the plate's upper-side portion 2a, thus photographing the inside of this photographing area all the time. If a user comes nearer to the inside of a predetermined distance range from the diffusion screen 3, a not-illustrated processing unit detects this user. Also, if the user points at the surface of the diffusion screen 3 with his or her finger or a rod-like object, this finger tip or rod tip (which, hereinafter, will be explained as the finger tip) is detected. The image projected from the projector 5 onto the diffusion screen 3 is switched in accordance with this detection result.

Incidentally, in the present embodiment, the explanation will be given selecting, as its example, the projection of an image onto the diffusion screen 3 performed by the projector 5. It is also possible, however, to use, e.g., a liquid-crystal display or plasma display in substitution for this projection scheme.

FIG. 2 is a system configuration diagram for illustrating a concrete example of the processing unit provided inside the housing 1 of the image display apparatus illustrated in FIG. 1A to FIG. 1G The reference numerals given here denote the following configuration components, respectively: 6 input unit, 7 system control unit, 7a photographing-target detection unit, 7b position-judgment processing unit, 7c operating-area specification unit, 7d memory unit, 8 image-signal processing unit, 9 display unit.

On the above-described drawing, the photographing signal from the video camera 4 (FIG. 1A to FIG. 1G) is inputted into the input unit 6, then being supplied to the system control unit 7. This system control unit 7 includes the photographing-target detection unit 7a, the position-judgment processing unit 7b, the operating-area specification unit 7c, and the memory unit 7d. From the photographing signal supplied to the unit 7, the photographing-target detection unit 7a detects the image or finger tip of a user who has come nearer to this image display apparatus. When the photographing-target detection unit 7a detects the image or finger tip of the user, the position-judgment processing unit 7b judges the position of the user or the finger tip within the spatial area relative to the diffusion screen 3 (FIG. 1A to FIG. 1G). Then, based on this judgment result, the operating-area specification unit 7c specifies a this-user-based operating-area relative to the diffusion screen 3. Image information in accordance with this specification result is read into the memory unit 7d, then creating an image signal. This image signal, after being processed by the image-signal processing unit 8, is supplied to the display unit 9. This display unit 9 allows the image corresponding to this image signal to be displayed onto the diffusion screen 3 by using the projector 5 (FIG. 1A to FIG. 1G).

Next, the explanation will be given below concerning an introduction picture to be displayed on the diffusion screen 3.

FIG. 3 is a diagram for illustrating a concrete example of an advertisement picture as the initial picture to be displayed on the diffusion screen 3. The reference numerals given here denote the following configuration components, respectively: 10 advertisement picture, 11 commodity pictures, 12 commodity-picture arrangement.

On the above-described drawing, when no one has come nearer to the diffusion screen 3, the diffusion screen 3 displays thereon the advertisement picture 10. This advertisement picture 10 displays thereon the commodity-picture arrangement 12, where the plurality of (here, five units of) commodity pictures 11 are arranged in the transverse direction. Here, each commodity picture 11 shows and introduces a single commodity by using a thumbnail picture (i.e., still-frame picture) or character information.

This commodity-picture arrangement 12 is being scrolled in its arrangement direction (i.e., the transverse direction). In accompaniment with this scrolling, the commodity picture 11 positioned at one end of the arrangement gets out of one end of the diffusion screen 3. Simultaneously, another commodity picture 11 appears into the inside of the diffusion screen 3 from the other end thereof. Based on this scrolling scheme, the commodities at all of the sales counters (or stores) at a large-sized store, such as restaurant, shop, and facility/service, can be displayed by the commodity pictures 11.

Also, of the commodity pictures 11 displayed on the diffusion screen 3 at present, the commodity picture 11 displayed at its center (i.e., the commodity picture 11 of a commodity "A" at the displayed point-in-time) is displayed in a manner of being positioned on the nearest side. Meanwhile, the commodity pictures 11 positioned on both sides thereof are displayed in a manner of being positioned on the deeper side, as the commodity pictures 11 come nearer to each end of the diffusion screen 3. On account of this display scheme, the commodity picture 11 of the commodity "A" displayed at the center is displayed in a manner of being made the largest. Meanwhile, the commodity pictures 11 of commodities "Z" and "B" positioned on both sides thereof are displayed in a manner of being partially hidden behind the commodity picture 11 of the commodity "A", and in a manner of being made smaller than the commodity picture 11 of the commodity "A".

It is assumed that a person comes nearer to the diffusion screen 3 in the state where the above-described advertisement picture 10 is displayed thereon, and that the person enters the inside of the range of a predetermined first distance (e.g., 3 meters) from the diffusion screen 3. At this time, instead of the above-described advertisement picture 10, an operation guidance picture is displayed on the diffusion screen 3.

FIG. 4 is a diagram for illustrating a concrete example of the operation guidance picture to be displayed on the diffusion screen 3. The reference numerals given here denote the following configuration components, respectively: 10*a* operation guidance picture, 11*a* commodity picture, 13 handprint, 14 guidance message, 15 genre-selection operation guidance unit, 16 commodity-selection operation guidance unit. The overlapped explanation will be omitted by allocating the same reference numerals to the configuration components corresponding to the ones illustrated in FIG. 3.

On the above-described drawing, this operation guidance picture 10*a* displays thereon the commodity-picture arrangement 12 displayed on the advertisement picture 10 illustrated in FIG. 3. This display is performed in such a manner that the respective commodity pictures 11 are not overlapped with each other, and are sequentially scrolled (the arrow indicates the scrolling direction). With respect to this commodity-picture arrangement 12, the commodity picture 11*a* positioned at its center is displayed in a state of being pointed at by the handprint 13. On account of this display scheme, this commodity picture 11*a* positioned at the center is displayed in a manner of being made larger than the other commodity pictures 11.

Also, this operation guidance picture 10*a* displays thereon the genre-selection operation guidance unit 15 and the commodity-selection operation guidance unit 16 on the upper side of the commodity-picture arrangement 12. Furthermore, the picture 10*a* displays thereon the guidance message 14 on the upper side of these units, such as, e.g., "Bringing your hand nearer to this guidance picture displays the guidance of stores and facilities." The genre-selection operation guidance unit 15 indicates a genre-selecting method, which will be described later, with the use of a state of the hand tip. The commodity-selection operation guidance unit 16 also indicates a commodity-selecting method, which will be described later, with the use of a state of the hand tip.

When a person (who, hereinafter, will be referred to as "a user") comes nearer to the inside of the range of a predetermined second distance (e.g., 1 meter) from the diffusion screen 3, an introduction picture is displayed thereon. This introduction picture is used for introducing the commodities that are on sale at this large-sized store, and the sales counters of these commodities. This display of the introduction picture is performed based on the displayed contents of the guidance message 14, the genre-selection operation guidance unit 15, and the commodity-selection operation guidance unit 16 displayed on the operation guidance picture 10*a*. Also, the user bringing his or her hand tip nearer to the diffusion screen 3 allows implementation of the display of a pointer for selecting the commodities and the like.

Figure 5:
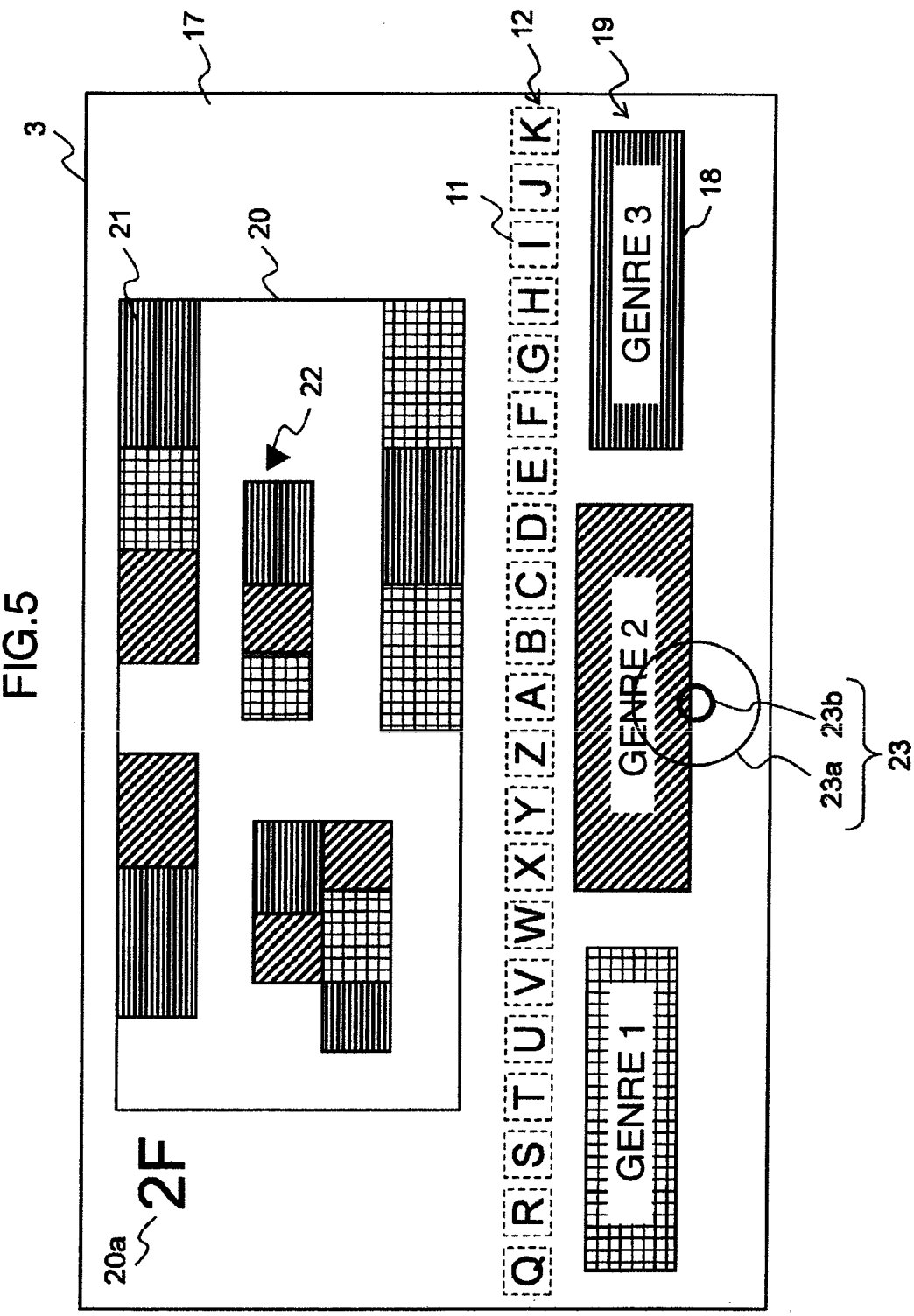
FIG. 5 is a diagram for illustrating a concrete example of an introduction picture to be displayed on the transparent screen in FIG. 1A to FIG. 1G.

FIG. 5 is a diagram for illustrating a concrete example of the introduction picture to be displayed on the diffusion screen 3 in FIG. 1A to FIG. 1G. The reference numerals given here denote the following configuration components, respectively: 12 second hierarchy menu (i.e., commodity-picture arrangement), 17 introduction picture, 18 genre pictures, 19 first hierarchy menu (i.e., genre-picture arrangement), 20 map image, 20*a* floor number, 21 image of facilities such as sales counters, 22 present-position mark, 23 double-ring pointer, 23*a* variable-diameter ring, 23*b* fixed-diameter ring. The overlapped explanation will be omitted by allocating the same reference numerals to the configuration components corresponding to the ones illustrated in FIG. 4.

On the above-described drawing, the introduction picture 17 displays thereon the genre-picture arrangement 19, i.e., the arrangement of the genre pictures 18 in the transverse direction, the commodity-picture arrangement 12, i.e., the arrangement of the commodity pictures 11 in the transverse direction, and the map image 20 (the user's merely coming nearer within the above-described second distance range, however, does not allow the display of the double-ring pointer 23 including the variable-diameter ring 23*a* and the fixed-diameter ring 23*b*). The genre-picture arrangement 19, i.e., the arrangement of the genre pictures 18, is displayed on the nearer side (i.e., the side on which the user exists) on the surface of the diffusion screen 3. The map image 20 is displayed on the deeper side (i.e., the opposite side to the side on which the user exists) on the surface of the diffusion screen 3. The commodity-picture arrangement 12, i.e., the arrangement of the commodity pictures 11, is displayed between the display area of the genre-picture arrangement 19 and the display area of the map image 20.

Incidentally, the genre-picture arrangement 19, which becomes a higher-order hierarchy menu for selecting the commodity pictures 11, will also be referred to as "first hierarchy menu 19" hereinafter. Also, the commodity-picture arrangement 12, which becomes a menu of the commodities on each genre basis, will also be referred to as "second hierarchy menu 12" hereinafter. This is because, as will be described later, selectively specifying whatever commodity of the commodity-picture arrangement 12 allows the specification of a sales counter within the map image 20 for purchasing the commodity specified.

Here, the genre pictures 18 of the first hierarchy menu 19 indicate the types (i.e., genres) of the sales counters (or stores), such as restaurant, shop, and facility/service. The genre pictures 18 are expressed using icons or character information (text) which indicate these types. Also, the commodity pictures 11 of the second hierarchy menu 12 are caused to correspond to the genre pictures 18 of the first hierarchy menu 19. The commodity pictures 11 are created in such a manner that the commodities sold at the respective sales counters are expressed using thumbnail pictures or character information. Here, the commodities are curry rice, pasta, and omelet in the case of, e.g., the genre "restaurant", and are clothes and shoes in the case of, e.g., the genre "shop". The thumbnail commodity pictures 11 belonging to one and the same genre are displayed in a manner of being opposed to the genre picture 18 of the corresponding genre of the genre-picture arrangement 19. For example, the commodities X to Z and A to D, which are the commodities belonging to the "genre 2", are displayed in a manner of being opposed to the genre picture 18 of the "genre 2". Moreover, the map image 20 indicates a map for indicating the sales counters 21 of the commodities displayed by the commodity pictures 11. As the default, the map image 20 of a floor at which this image display apparatus is set up is displayed together with the floor number 20*a* of the building of this large-sized store. Also, when this map image 20 indicates the floor at which this image display apparatus is set up (here, the floor number 20*a* of "2F" is displayed as the second floor), the set-up position of this image display apparatus is displayed as the present position by using the present-position mark 22.

Figure 6:
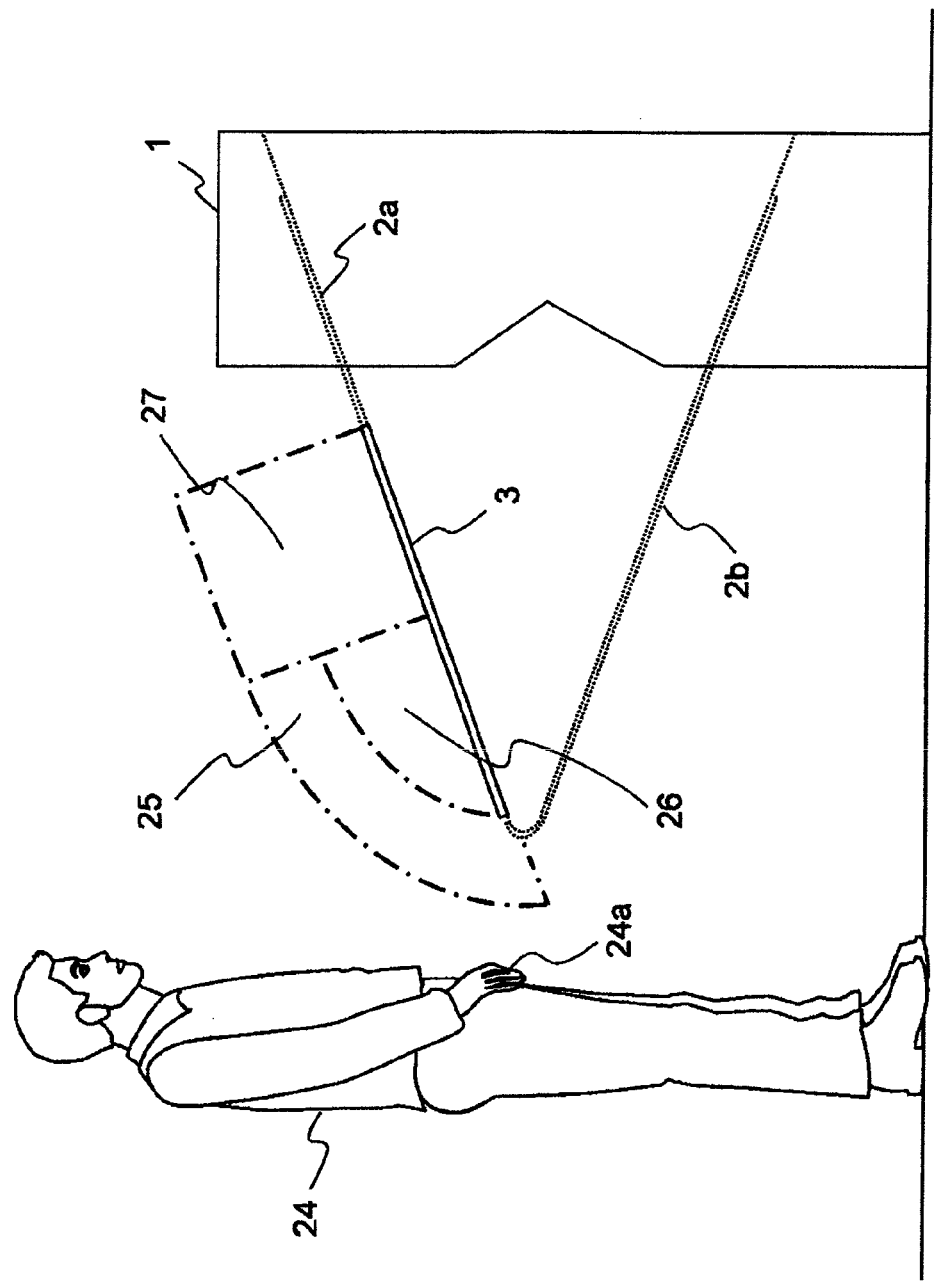
FIG. 6 is a diagram for illustrating a state at the time when the user comes nearer to the inside of a specified distance range from the transparent screen.

FIG. 6 is a diagram for illustrating the state at the time when the user comes nearer to the inside of the above-described second distance range from the diffusion screen 3. The reference numerals given here denote the following configuration components, respectively: 24 user, 24*a* hand's front end (i.e., hand tip), 25 first distance area, 26 second distance area, 27 third distance area. The overlapped explanation will be omitted by allocating the same reference numerals to the configuration components corresponding to the ones illustrated in FIG. 1.

When the user has still stayed within the above-described first distance range from the diffusion screen 3, and is away from the above-described second distance range, the operation guidance picture 10*a* illustrated in FIG. 4 is displayed on the diffusion screen 3. Moreover, if the user has entered the inside of this second distance range, the introduction picture 17 illustrated in FIG. 5 is displayed thereon. FIG. 6 illustrates the state of the user 24 at this time. The user's merely coming nearer to the diffusion screen 3 in this way, however, does not allowed the double-ring pointer 23 to be displayed on the introduction picture 17 illustrated in FIG. 5.

Here, in a space over the diffusion screen 3, a spatial area corresponding to the display area of the genre-picture arrangement (i.e., first hierarchy menu) 19 on the diffusion screen 3 is set as the first distance area 25. Similarly, a spatial area corresponding to the display area of the commodity-picture arrangement (i.e., second hierarchy menu) 12 on the diffusion screen 3 is set as the second distance area 26. Similarly, a spatial area corresponding to the display area of the map image 20 on the diffusion screen 3 is set as the third distance area 27.

The user 24 inserts the hand tip 24*a* into the inside of the first distance area 25. In response thereto, the system control unit 7 (FIG. 2) detects this operation from the photographing signal transmitted from the video camera 4 (FIG. 1A to FIG. 1G). Moreover, based on this detection result, the double-ring pointer 23 is displayed within the display area of the genre-picture arrangement (i.e., first hierarchy menu) 19 as is illustrated in FIG. 5. At this time, based on the photographing signal from the camera 4 (FIG. 1A to FIG. 1 G), the system control unit 7 (FIG. 2) detects the position and direction of the hand tip 24*a* within the first distance area 25. Furthermore, the unit 7 causes the double-ring pointer 23 to be displayed at a position which corresponds to this detection result within the display area of the genre-picture arrangement (i.e., first hierarchy menu) 19 on the diffusion screen 3.

Also, the user 24 causes the hand tip 24*a* to pass through the first distance area 25, and then inserts the hand tip 24*a* into the inside of the second distance area 26. In response thereto, the system control unit 7 (FIG. 2) detects this operation. Moreover, although not illustrated, the double-ring pointer 23 is displayed within the display area of the commodity-picture arrangement (i.e., second hierarchy menu). At this time, based on the photographing signal from the camera 4 (FIG. 1A to FIG. 1 G), the system control unit 7 also detects the position and direction of the hand tip 24*a* within the second distance area 26. Furthermore, the unit 7 causes the double-ring pointer 23 to be displayed at a position which corresponds to this detection result within the display area of the corresponding commodity picture 11 of the commodity-picture arrangement (i.e., second hierarchy menu) 12 on the diffusion screen 3.

Still also, the user 24 inserts the hand tip 24*a* into the inside of the third distance area 27. In response thereto, the system control unit 7 (FIG. 2) detects this operation. Moreover, although not illustrated, the double-ring pointer 23 is displayed within the display area of the map image 20. At this time, based on the photographing signal from the camera 4 (FIG. 1A to FIG. 1G), the system control unit 7 also detects the position and direction of the hand tip 24*a* within the third distance area 27. Furthermore, the unit 7 causes the double-ring pointer 23 to be displayed at a position which corresponds to this detection result within the display area of the map image 20 on the diffusion screen 3.

Here, in the double-ring pointer 23, the fixed-diameter ring 23*b* is a ring whose diameter is fixed. The diameter of the ring 23*b* is so set as to correspond to a predetermined distance from the display surface of the first hierarchy menu 19 on the diffusion screen 3. The variable-diameter ring 23*a* is a ring whose diameter varies in response to the distance from this predetermined distance to the position of the hand tip 24*a*. Accordingly, when the hand tip 24*a* starts to enter the inside of the first distance area 25, the diameter of the variable-diameter ring 23*a* is large. The nearer the hand tip 24*a* comes to the display area of the first hierarchy menu 19 on the diffusion screen 3, the smaller the diameter of the variable-diameter ring 23*a* becomes. Of course, in accompaniment with this change, if the hand tip 24*a* has changed in its position in a direction parallel to the surface of the diffusion screen 3, the double-ring pointer 23 changes in its position over the surface of the diffusion screen 3.

Figure 7:
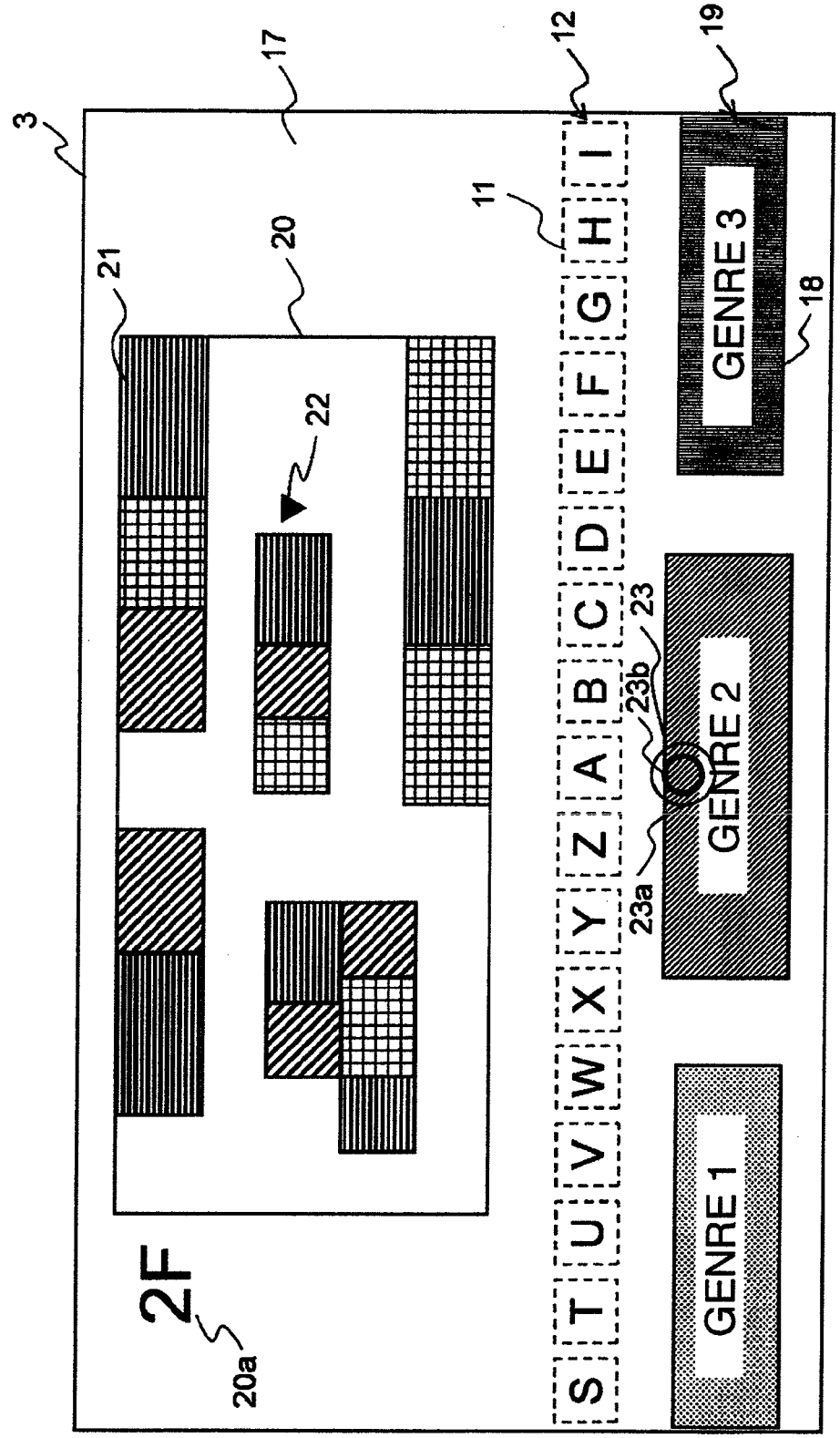
FIG. 7 is a diagram for illustrating the state of a double-ring pointer at the time when the user brings his or her hand tip nearer to a first hierarchy menu within the first distance area in FIG. 6.

FIG. 7 is a diagram for illustrating the state of the double-ring pointer 23 in the case where the user 24 brings his or her hand tip 24*a* nearer to the first hierarchy menu (i.e., genre-picture arrangement) 19 within the first distance area 25. FIG. 7 indicates that, on the genre picture 18 of the "genre 2", the diameter of the variable-diameter ring 23*a* has become smaller as compared with the diameter of the state illustrated in FIG. 5.

As is illustrated in FIG. 8A, the user 24 has performed a gesture of displacing his or her hand tip 24*a* into the second distance area 26 through the first distance area 25 from a directly-above direction. In this case, on the diffusion screen 3, the display state of the introduction picture 17 illustrated in FIG. 7 is switched to the display state of the introduction picture 17 illustrated in FIG. 9. Incidentally, a method of displacing the hand tip 24*a* into the second distance area 26 through the first distance area 25 is not limited to the method illustrated in FIG. 8A. Namely, the following methods are also allowable: A method of displacing the hand tip 24*a* into the second distance area 26 through the first distance area 25 in an obliquely-below direction, or a method of displacing the hand tip 24a into the second distance area 26 through the first distance area 25 in a horizontal direction. Namely, it is allowable to displace the hand tip 24a in whatever direction, as long as the method is a one of displacing the hand tip 24a into the second distance area 26 through the first distance area 25.

Incidentally, in FIG. 9, the reference numerals given denote the following configuration components, respectively: 21a image of the sales counter of a specified commodity (which, hereinafter, will be simply referred to as "specified commodity's sales counter"), 28 connection line, 29 image of the commercial/advertisement sign of the sales counterz (which, hereinafter, be simply referred to as "sales counter's commercial/advertisement sign"). The overlapped explanation will be omitted by allocating the same reference numerals to the configuration components corresponding to the ones illustrated in the foregoing drawings.

On the above-described drawing, on this introduction picture 17, the double-ring pointer 23 is positioned on a single commodity picture 11a in the second hierarchy menu (i.e., commodity-picture arrangement) 12. This commodity picture 11a is the commodity picture 11 in the second hierarchy menu 12 that is opposed to the position at which the double-ring pointer 23 exists on the genre picture 18 (here, the genre picture 18 of the "genre 2") in the first hierarchy menu (i.e., genre-picture arrangement) 19 on the introduction picture 17 illustrated in FIG. 7. On the introduction picture 17 illustrated in FIG. 7, the commodity picture 11 in the second hierarchy menu that exists at the position opposed to the double-ring pointer 23 (more strictly, the fixed-diameter ring 23b of this double-ring pointer 23) is the commodity picture 11 of the commodity "A". Consequently, it turns out that the double-ring pointer 23 displaces onto this commodity picture 11 of the commodity "A".

In this way, the double-ring pointer 23 displaces from the genre picture 18 in the first hierarchy menu 19 to the commodity picture 11 in the second hierarchy menu 12. At the time of this displacement, on the introduction picture 17 illustrated in FIG. 5, the genre-picture arrangement 19, i.e., the first hierarchy menu 19, is ejected from the diffusion screen 3 while displacing on the diffusion screen 3 in a downward direction. The commodity-picture arrangement 12, i.e., the second hierarchy menu 12, is scaled up while also displacing thereon in the downward direction. As a result, it turns out that the commodity-picture arrangement 12 is displayed at the position at which the first hierarchy menu 19 had been displayed. In the meantime, the position of the double-ring pointer 23 is fixed. On account of this condition, it turns out that, when the introduction picture 17 illustrated in FIG. 5 is switched to the introduction picture 17 illustrated in FIG. 9 as a result of the displacements of the first hierarchy menu 19 and the second hierarchy menu 12, the following state occurs: Namely, as described above, the double-ring pointer 23 exists on the commodity picture 11 that has come to be positioned at the position at which the double-ring pointer 23 had existed in the first hierarchy menu 19 on the introduction picture 17 illustrated in FIG. 5. Consequently, it turns out that this commodity picture 11 of the commodity "A" is specified by the double-ring pointer 23. The commodity picture 11 specified by the double-ring pointer 23 in this way is displayed in a manner of being scaled up more largely than the other commodity pictures 11 in the second hierarchy menu 12.

Incidentally, in this way in the double-ring pointer 23 that lies in the state of having specified the commodity picture 11, the variable-diameter ring 23a is a ring whose diameter is smaller than that of the fixed-diameter ring 23b. Accordingly, the variable-diameter ring 23a is displayed within the fixed-diameter ring 23b. In other words, the double-ring pointer 23 where the fixed-diameter ring 23b is positioned on the inner side of the variable-diameter ring 23a specifies the state where the hand tip 24a of the user 24 is positioned within the first distance area 25 (FIG. 8A to FIG. 8C), and specifies the genre picture 18 in the first hierarchy menu (i.e., genre-picture arrangement) 19. Conversely, the double-ring pointer 23 where the variable-diameter ring 23a is positioned on the inner side of the fixed-diameter ring 23b specifies the state where the hand tip 24a of the user 24 is positioned within the second distance area 26 (FIG. 8A to FIG. 8C), and specifies the commodity picture 11 in the second hierarchy menu (i.e., commodity-picture arrangement) 12. The condition that the variable-diameter ring 23a is positioned on the inner side of the fixed-diameter ring 23b indicates the following situation: Namely, in FIG. 8A to FIG. 8C, the hand tip 24a of the user 24 has exceeded the boundary between the first distance area 25 and the second distance area 26, and has entered the inside of the second distance area 26. Also, the condition that the variable-diameter ring 23a coincides with the fixed-diameter ring 23b and is overlapped therewith indicates the following situation: Namely, the hand tip 24a of the user 24 is positioned at the boundary between the first distance area 25 and the second distance area 26.

Figure 8C:
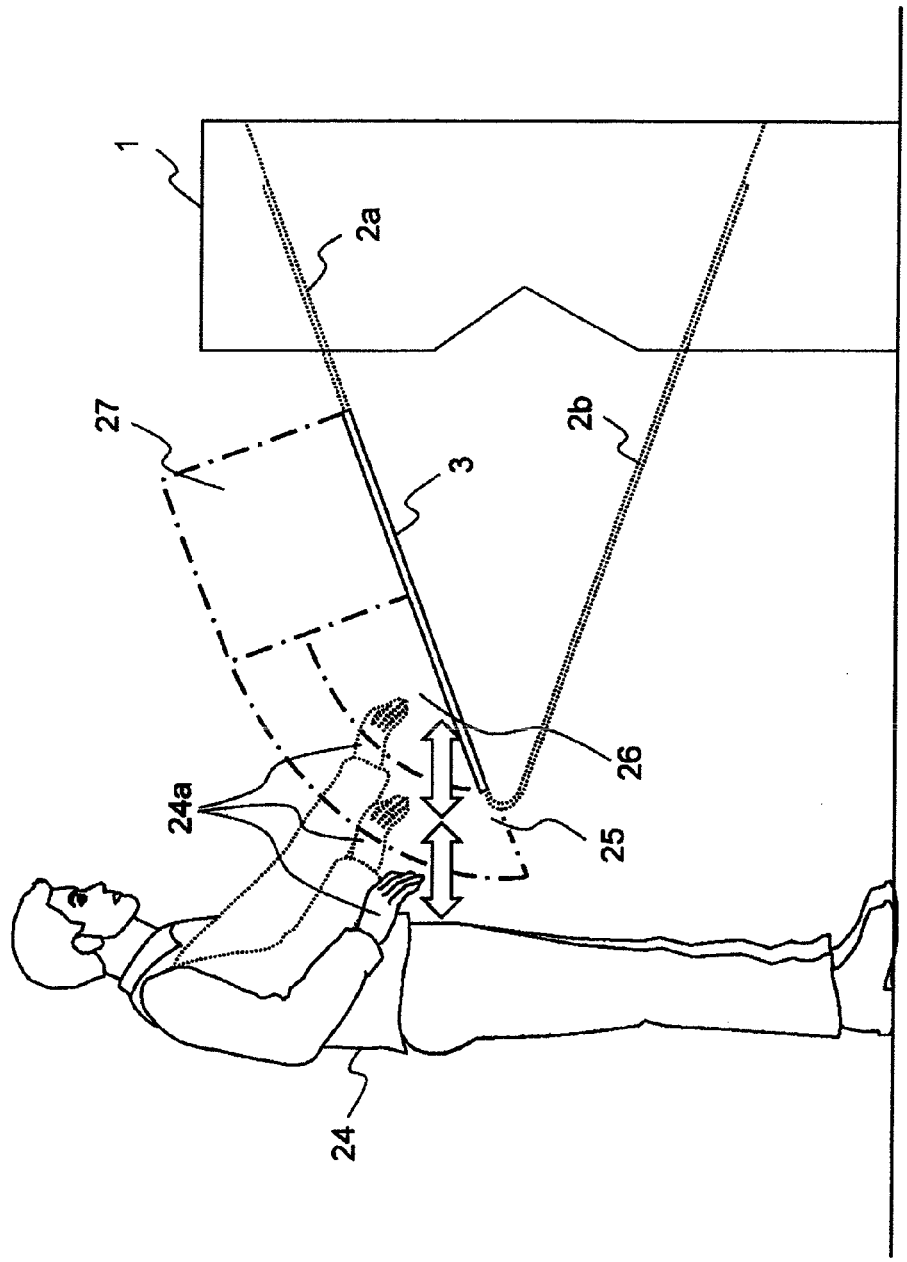
FIG. 8C is a diagram for illustrating a concrete example of the movement of the user at the time when the user displaces his or her hand tip into the second distance area through the first distance area in a horizontal direction.

FIG. 10a to FIG. 10d are diagrams for illustrating concrete examples of the changes in the double-ring pointer 23 which accompany the displacements of the hand tip 24a of the user 24 illustrated in FIG. 8A to FIG. 8C. The overlapped explanation will be omitted by allocating the same reference numerals to the configuration components corresponding to the ones illustrated in the foregoing drawings.

FIG. 10a illustrates the state of the double-ring pointer 23 on the introduction picture 17 illustrated in FIG. 5. Namely, FIG. 10a illustrates the state where, in FIG. 8A to FIG. 8C, the hand tip 24a of the user 24 starts to enter the inside of the first distance area 25. In this case, in FIG. 8A to FIG. 8C, the hand tip 24a of the user 24 has entered the inside of the first distance area 25. The hand tip 24a, however, is away from the boundary between the first distance area 25 and the second distance area 26 by the amount of a large distance. Accordingly, in the double-ring pointer 23, the diameter of the variable-diameter ring 23a becomes larger than that of the fixed-diameter ring 23b by the amount equivalent to this distance.

FIG. 10b illustrates the state of the double-ring pointer 23 on the introduction picture 17 illustrated in FIG. 7. Namely, FIG. 10a illustrates the state where, in FIG. 8A to FIG. 8C, the hand tip 24a of the user 24 still remains within the first distance area 25, but comes nearer to the boundary between the first distance area 25 and the second distance area 26 as compared with the state illustrated in FIG. 10a. On account of this condition, the diameter of the variable-diameter ring 23a of the double-ring pointer 23 becomes smaller than the one in the state illustrated in FIG. 10a. This is because the distance ranging from the hand tip 24a of the user 24 to the boundary between the first distance area 25 and the second distance area 26 within the first distance area 25 becomes smaller than the one in the state illustrated in FIG. 10a. Namely, as the hand tip 24a of the user 24 comes nearer to the boundary between the first distance area 25 and the second distance area 26 within the first distance area 25, the genre-picture arrangement (i.e. first hierarchy menu) 19 and the commodity-picture arrangement (i.e., second hierarchy menu) 12 are gradually scaled up, and the diameter of the variable-diameter ring 23a becomes smaller. However, as long as the hand tip 24a of the user 24 remains within the first distance area 25, the diameter of the variable-diameter ring 23*a* is larger than that of the fixed-diameter ring 23*b*.

FIG. 10*c* illustrates the state where, in FIG. 8A to FIG. 8C, the hand tip 24*a* of the user 24 has reached the boundary between the first distance area 25 and the second distance area 26 within the first distance area 25. In this case, the diameter of the variable-diameter ring 23*a* and that of the fixed-diameter ring 23*b* are equal to each other. Namely, these rings 23*a* and 23*b* coincide with each other.

From the state described above, the user 24 further displaces the hand tip 24*a* toward the second distance area 26 (FIG. 8A to FIG. 8C). At this time, as explained earlier in FIG. 7, the genre-picture arrangement (i.e. first hierarchy menu) 19 displaces in the downward direction of the diffusion screen 3 while the genre-picture arrangement is being gradually scaled up. In accompaniment therewith, the commodity-picture arrangement (i.e., second hierarchy menu) 12 also displaces in the downward direction while the commodity-picture arrangement is being gradually scaled up. As a result of these displacements, there occurs the state where the double-ring pointer 23 exists on whatever commodity picture 11 of this commodity-picture arrangement (i.e., second hierarchy menu) 12. FIG. 10*d* illustrates this state. At this time, the hand tip 24*a* of the user 24 enters the inside of the second distance area 26 from the boundary between the first distance area 25 and the second distance area 26. As a consequence, the hand tip 24*a* comes nearer to the surface of the diffusion screen 3. Accordingly, the diameter of the variable-diameter ring 23*a* becomes smaller than that of the fixed-diameter ring 23*b* by the amount equivalent to a distance at which the hand tip 24*a* has entered the inside of the second distance area 26 from this boundary. Consequently, there occurs the state where the variable-diameter ring 23*a* is positioned on the inner side of the fixed-diameter ring 23*b*.

FIG. 10A to FIG. 10D are diagrams for illustrating concrete examples of the changes in the double-ring pointer 23 and the first and second hierarchy menus 19 and 12 which accompany the displacements of the hand tip 24*a* of the user 24 illustrated in FIG. 8A to FIG. 8C. The overlapped explanation will be omitted by allocating the same reference numerals to the configuration components corresponding to the ones illustrated in the foregoing drawings.

These concrete examples are as follows: Namely, only when the diameter of the variable-diameter ring 23*a* and that of the fixed-diameter ring 23*b* are equal to each other, and these rings 23*a* and 23*b* coincide (i.e., are overlapped) with each other, the first and second hierarchy menus 19 and 12 are scaled up or scaled down. A not-illustrated area (i.e., thickness) for switching the hierarchy menus exists along the boundary portion between the first distance area 25 and the second distance area 26 illustrated in FIG. 8A to FIG. 8C. While the hand tip 24*a* is passing through this area, the rings 23*a* and 23*b* of the double-ring pointer 23 coincide (i.e., are overlapped) with each other, and the first and second hierarchy menus 19 and 12 are scaled up or scaled down.

FIG. 10A illustrates the state where, in FIG. 8A to FIG. 8C, the hand tip 24*a* of the user 24 starts to enter the inside of the first distance area 25. In this case, in FIG. 8A to FIG. 8C, the hand tip 24*a* of the user 24 has entered the inside of the first distance area 25. The hand tip 24*a*, however, is away from the boundary between the first distance area 25 and the second distance area 26 by the amount of a large distance. Accordingly, similarly to the case illustrated FIG. 10*a*, in the double-ring pointer 23, the diameter of the variable-diameter ring 23*a* becomes larger than that of the fixed-diameter ring 23*b* by the amount equivalent to this distance. At this time, however, the second hierarchy menu 12 is in a non-active state. Namely, each commodity picture 11 is displayed, but cannot be operated. The image of each commodity is not displayed.

FIG. 10B illustrates the state which corresponds to FIG. 10*b*. Namely, FIG. 10B illustrates the state where, in FIG. 8A to FIG. 8C, the hand tip 24*a* of the user 24 still remains within the first distance area 25, but comes nearer to the boundary between the first distance area 25 and the second distance area 26 as compared with the state illustrated in FIG. 10A. On account of this condition, similarly to the case illustrated in FIG. 10*b*, the diameter of the variable-diameter ring 23*a* of the double-ring pointer 23 becomes smaller than the one in the state illustrated in FIG. 10A. This is because the distance ranging from the hand tip 24*a* of the user 24 to the boundary between the first distance area 25 and the second distance area 26 within the first distance area 25 becomes smaller than the one in the state illustrated in FIG. 10A. Namely, as the hand tip 24*a* of the user 24 comes nearer to the boundary between the first distance area 25 and the second distance area 26 within the first distance area 25, the diameter of the variable-diameter ring 23*a* becomes smaller. However, as long as the hand tip 24*a* of the user 24 remains within the first distance area 25, the diameter of the variable-diameter ring 23*a* is larger than that of the fixed-diameter ring 23*b*. Also, each commodity picture 11 in the second hierarchy menu 12 remains in the non-active state. Unlike the cases in FIG. 10*a* to FIG. 10*d*, however, the genre-picture arrangement (i.e. first hierarchy menu) 19 and the commodity-picture arrangement (i.e., second hierarchy menu) 12 are not scaled up, and are displayed in the same scale-size as the one when displayed in FIG. 10A.

FIG. 10C illustrates the state where, in FIG. 8A to FIG. 8C, the hand tip 24*a* of the user 24 has reached the boundary between the first distance area 25 and the second distance area 26 within the first distance area 25. In the state like this, the diameter of the variable-diameter ring 23*a* and that of the fixed-diameter ring 23*b* are equal to each other, and these rings 23*a* and 23*b* coincide with each other. At this time, the first hierarchy menu 19 also falls into the non-active state in accompaniment with the second hierarchy menu 12. Accordingly, either of the first and second hierarchy menus 19 and 12 cannot be operated. As described earlier, in the concrete examples illustrated in FIG. 10A to FIG. 10C, the above-described hierarchy-menu-switching area (i.e., thickness: boundary area) exists along the boundary portion between the first distance area 25 and the second distance area 26 illustrated in FIG. 8A to FIG. 8C. When the hand tip 24*a* enters this boundary area, the fixing is made to the state where the diameters of the rings 23*a* and 23*b* of the double-ring pointer 23 become equal to each other. Then, the hand tip 24*a* is displaced toward the second distance area 26 without changing this fixed state. This operation causes each of the first and second hierarchy menus 19 and 12 to be gradually scaled up while displacing toward the lower portion of the screen. Moreover, in this state, the hand tip 24*a* is displaced toward the first distance area 25 within the above-described boundary area. This operation causes the first and second hierarchy menus 19 and 12 to be gradually scaled down while displacing toward the upper portion of the screen. As a result, the first and second hierarchy menus 19 and 12 fall into a state where their scale-sizes are close to the ones illustrated in FIG. 10B. Namely, in the cases illustrated in FIG. 10A to FIG. 10D, the first and second hierarchy menus 19 and 12 at the time of the case illustrated in FIG. 10C are scaled up while displacing. Meanwhile, at the time of the case illustrated in FIG. 10B, the scale-sizes and positions of the first and second hierarchy menus 19 and 12 remain unchanged.

The user 24 displaces the hand tip 24a toward the second distance area 26 (FIG. 8A to FIG. 8C). At this time, similarly to the case illustrated in FIG. 10a to FIG. 10d, as explained earlier in FIG. 7, the genre-picture arrangement (i.e. first hierarchy menu) 19 displaces in the downward direction of the diffusion screen 3. In accompaniment therewith, the commodity-picture arrangement (i.e., second hierarchy menu) 12 also displaces in the downward direction while the commodity-picture arrangement is being scaled up, and with each commodity picture 11 falling into an active state. As a result of these displacements, there occurs the state where the double-ring pointer 23 exists on whatever commodity picture 11 of this commodity-picture arrangement (i.e., second hierarchy menu) 12. FIG. 10D illustrates this state. At this time, the hand tip 24a of the user 24 enters the inside of the second distance area 26 from the hierarchy-menu-switching area (i.e., boundary area) existing along the boundary portion between the first distance area 25 and the second distance area 2. As a consequence, the hand tip 24a comes nearer to the surface of the diffusion screen 3. Accordingly, the diameter of the variable-diameter ring 23a becomes smaller than that of the fixed-diameter ring 23b by the amount equivalent to the distance at which the hand tip 24a has entered the inside of the second distance area 26 from this boundary area. Consequently, there occurs the state where the variable-diameter ring 23a is positioned on the inner side of the fixed-diameter ring 23b.

Also, on the introduction picture 17 illustrated in FIG. 9, the (specified) commodity picture 11a on which the double-ring pointer 23 rides is displayed in a manner of being scaled up more largely than the other commodity pictures 11 displayed. Moreover, the connection line 28 is displayed in a manner of being extended from this commodity picture 11a, which is specified by the double-ring pointer 23, to the sales counter (i.e., specified commodity's sales counter) 21a on the map image 20 at which the commodity of the specified commodity picture 11a is on sale. In this way, as a result of selectively specifying the commodity picture 11a of a commodity that the use wishes to buy, this connection line 28 is displayed from this specified commodity picture 11a. The display of this connection line 28 makes it possible to immediately confirm the specified commodity's sales counter 21a at which the commodity commercialized by this specified commodity picture 11a is on sale. Furthermore, in accompaniment therewith, the sales counter's commercial/advertisement sign image 29 for commercializing this specified commodity's sales counter 21a is displayed. Although not illustrated, this sales counter' commercial/advertisement sign image 29 displays thereon information for commercializing this specified commodity's sales counter 21a.

Incidentally, on the map image 20, if, as is illustrated thereon, the specified commodity's sales counter 21a exists on the right-half side of the map image 20, the commercial/advertisement sign image 29 is displayed on the left-half side of the map image 20. In contrast thereto, FIG. 11 illustrates the introduction picture 17 on which a commodity picture 11b, which is different from the commodity picture 11a in FIG. 9, is specified, and thus a different sales counter 21b is specified. On this introduction picture 17, however, the specified commodity's sales counter 21b exists on the left-half side of the map image 20. In the case like this, the commercial/advertisement sign image 29 for this specified commodity's sales counter 21b is displayed on the right-half side of the map image 20. In this way, the commercial/advertisement sign image 29 for the specified commodity's sales counters 21a and 21b is displayed in the areas that are on the opposite sides to the sides on which the specified commodity's sales counters 21a and 21b are displayed. This display scheme makes it possible to accurately display map environments around the specified commodity's sales counters 21a and 21b, thereby allowing the accurate grasp of positions of the specified commodity's sales counters 21a and 21b.

By the way, the introduction picture 17 illustrated in FIG. 11 is the picture in the case where the commodity picture 11b is specified on the introduction picture 17 illustrated in FIG. 9. Moreover, the sales counter 21b, at which the commodity of this specified commodity picture 11b is on sale, is assumed to be on the first floor of this large-sized store. In this case, this map image 20 indicates the map of the first floor, and thus the floor number 20a is also displayed as being "1F (first floor)". Furthermore, this specified commodity picture 11b and the specified commodity's sales counter 21b on the map image 20 that indicates the map of the first floor are connected to each other by using the connection line 28.

Figure 12:
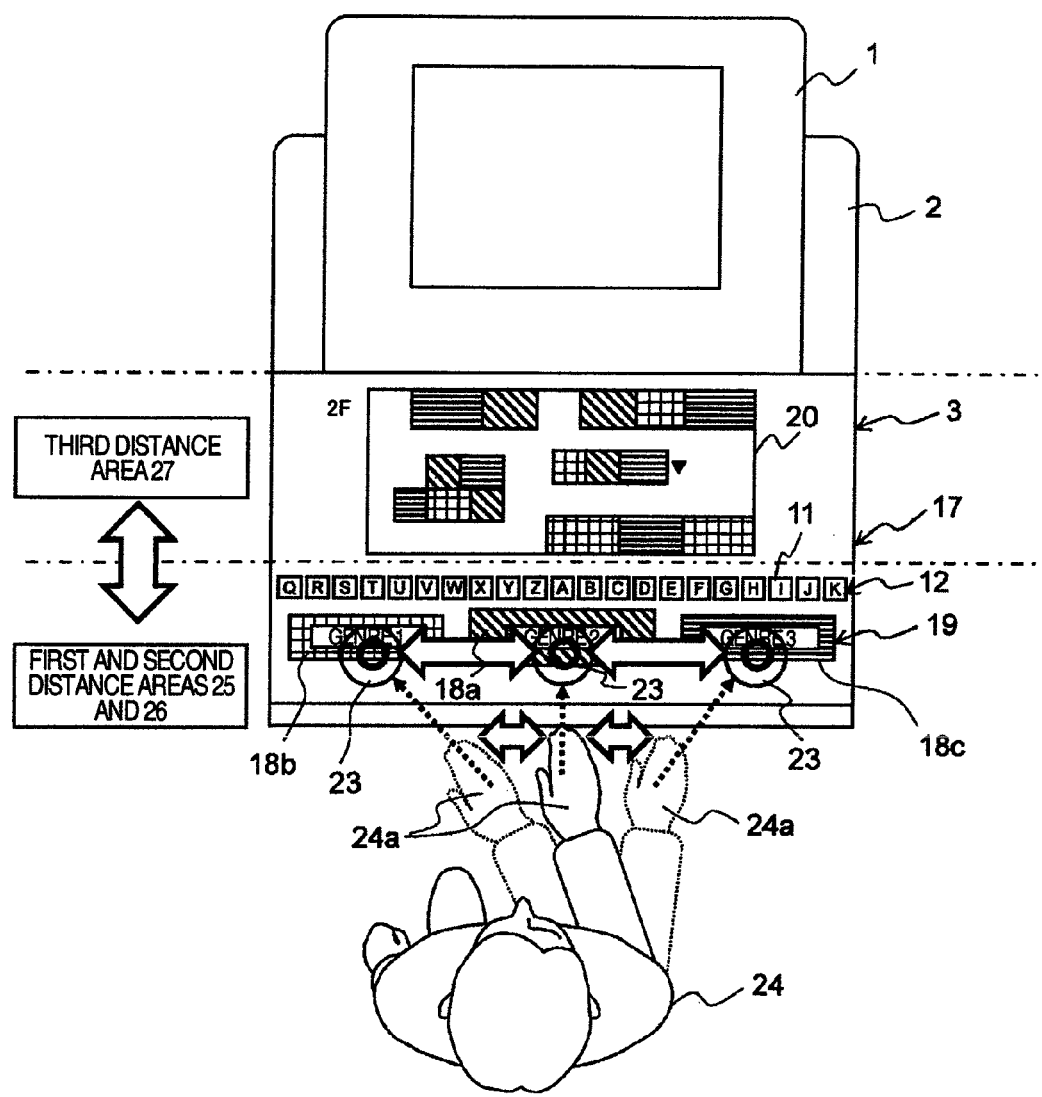
FIG. 12 is a diagram for illustrating a movement of the user's hand tip for displacing the double-ring pointer in the arrangement direction of the genre pictures in the second hierarchy menu on the introduction picture 17 illustrated in FIG. 5.

FIG. 12 is a diagram for illustrating a movement of the hand tip 24a of the user 24 for displacing the double-ring pointer 23 in the arrangement direction of the genre pictures in the first hierarchy menu 19 on the introduction picture 17 illustrated in FIG. 5. The reference numerals 18a to 18c denote the genre pictures. The overlapped explanation will be omitted by allocating the same reference numerals to the configuration components corresponding to the ones illustrated in the foregoing drawings.

On the above-described drawing, at present, the user 24 directs his or her hand tip 24a toward the front side of the screen within the first distance area 25. At this time, it is assumed that the double-ring pointer 23 is positioned on the genre picture 18a of the "genre 2" on the front side in the first hierarchy menu (i.e., genre-picture arrangement) 19. In this state, the user 24 directs his or her hand tip 24a onto the left side. This operation causes the double-ring pointer 23 to displace in the left direction, thereby allowing the pointer 23 to displace onto the genre picture 18b of the "genre 1" that is left-adjacent to the genre picture 18a. Also, when the double-ring pointer 23 is positioned on the genre picture 18a of the "genre 2", the user 24 directs his or her hand tip 24a onto the right side. This operation causes the double-ring pointer 23 to displace in the right direction, thereby allowing the pointer 23 to displace onto the genre picture 18c of the "genre 3" that is right-adjacent to the genre picture 18a.

In this way, merely changing the direction of the hand tip 24a allows the double-ring pointer 23 to displace in the arrangement direction of the genre pictures in the first hierarchy menu (i.e., genre-picture arrangement) 19. This feature makes it possible to change the genre picture 18 that is specified by the double-ring pointer 23.

Here, the hand tip 24a is positioned within the first distance area 25. Moreover, a distance is present between the hand tip 24a and the diffusion screen 3, which means that they are away from each other. In the case like this, as illustrated in FIG. 12, displacing the hand tip 24a a little bit in the right or left direction allows the double-ring pointer 23 to displace in the right or left direction significantly. Accordingly, merely displacing the hand tip 24a a little bit at the position away from the diffusion screen 3 makes it possible to select a genre picture 18 in the first hierarchy menu (i.e., genre-picture arrangement) 19.

Incidentally, although not illustrated here, the double-ring pointer 23 is caused to be positioned at the left end of the first hierarchy menu (i.e., genre-picture arrangement) 19 by directing the hand tip 24a onto the left side. This operation causes the first hierarchy menu (i.e., genre-picture arrangement) 19 to be scrolled in the right direction, thereby allowing a new genre picture 18 to appear from the left side. Conversely, the double-ring pointer 23 is caused to be positioned at the right end of the first hierarchy menu (i.e., genre-picture arrangement) 19 by directing the hand tip 24a onto the right side. This operation causes the first hierarchy menu (i.e., genre-picture arrangement) 19 to be scrolled in the left direction, thereby allowing a new genre picture 18 to appear from the right side. In this way, merely changing the direction of the hand tip 24a causes the genre pictures 18 to be scrolled, thereby making it possible to display a new genre picture 18 which has been not displayed so far. As a result, it also becomes possible to display all of the genre pictures 18 of the first hierarchy menu (i.e., genre-picture arrangement) 19. Also, in accompaniment with the scrolling of the first hierarchy menu (i.e., genre-picture arrangement) 19 like this, the second hierarchy menu (i.e., commodity-picture arrangement) 12 can also be scrolled in the same direction and at the same speed. This feature allows a genre picture 18 and the commodity pictures 11 of the genre corresponding thereto to be positioned in a manner of being opposed to each other.

Figure 13A:
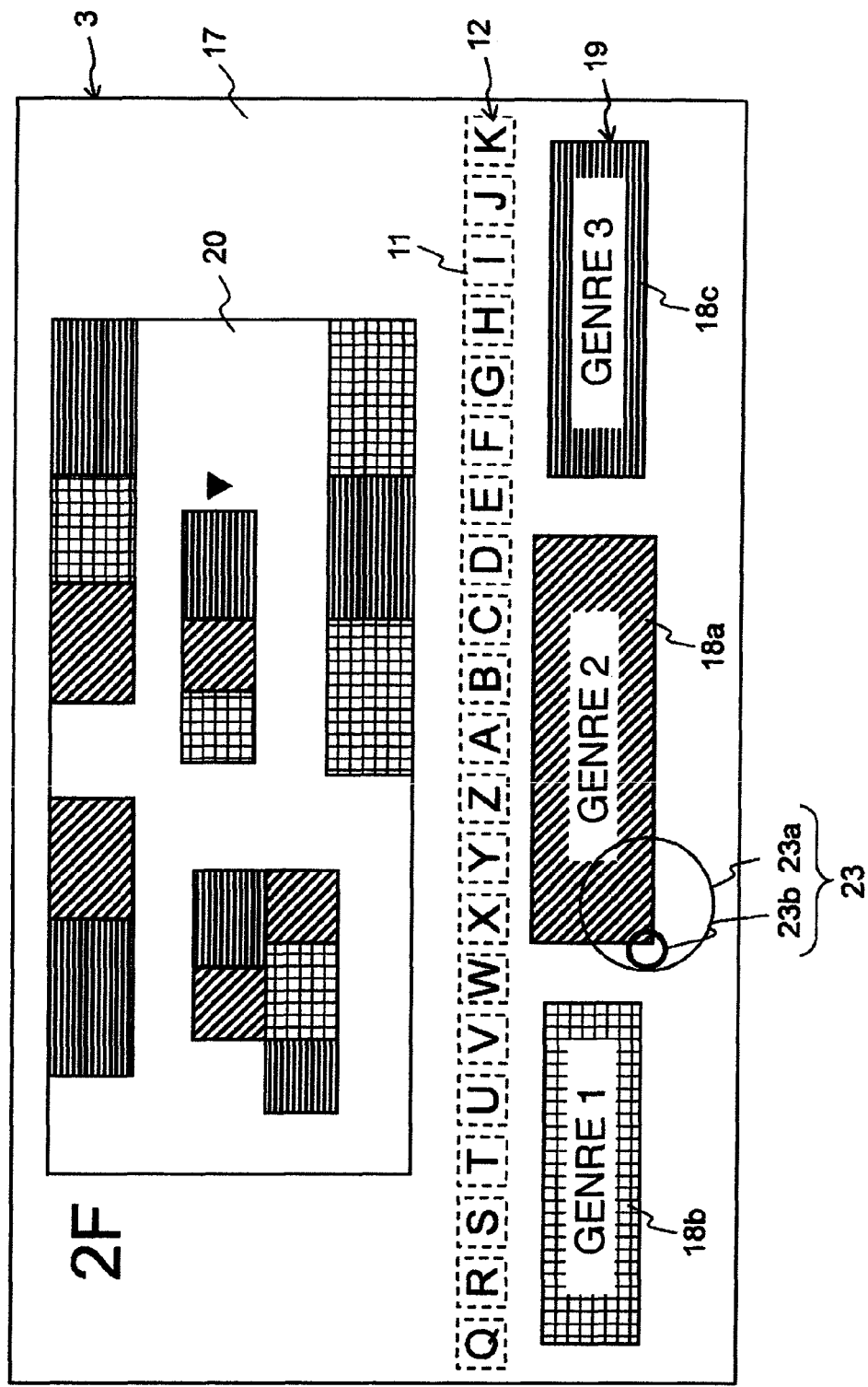
FIG. 13A is a diagram for illustrating the state of the double-ring pointer at the time when the double-ring pointer moves away from the genre picture on which the double-ring pointer has ridden so far.

FIG. 13A and FIG. 13B are diagrams for illustrating the states of the double-ring pointer at the time when the double-ring pointer displaces from one genre picture 18 to another genre picture 18 on the introduction picture 17 illustrated in FIG. 12. The overlapped explanation will be omitted by allocating the same reference numerals to the configuration components corresponding to the ones illustrated in the foregoing drawings.

FIG. 13A illustrates the state of the double-ring pointer 23 at the time when the double-ring pointer 23 moves away from the genre picture 18a on which the double-ring pointer 23 has ridden so far. The display area on which the genre-picture arrangement (i.e., first hierarchy menu) 19 is displayed is partitioned on each genre basis. Each partition constitutes each genre's virtual area onto which each genre is allocated. Each genre's virtual area displays thereon the genre picture 18 of the genre corresponding thereto. Also, on the display area on which the commodity-picture arrangement (i.e., second hierarchy menu) 12 is displayed, each genre's virtual area is also set up in a manner of being opposed to each genre's virtual area set up into the genre-picture arrangement (i.e., first hierarchy menu) 19. The commodities belonging to the genre on each genre's virtual area in the genre-picture arrangement (i.e., first hierarchy menu) 19 are allocated onto each genre's virtual area set up into the commodity-picture arrangement (i.e., second hierarchy menu) 12. Accordingly, the commodity pictures 11 of these commodities are displayed thereon.

In FIG. 13A, when the double-ring pointer 23 exists at the central position of the virtual area with respect to the genre picture 18a (which, hereinafter, will be referred to as "genre-picture-18a's virtual area". This technical term will be used alike hereinafter. Incidentally here, the genre-picture-18a's virtual area refers to an area between an intermediate point between the genre picture 18a and its left-adjacent genre picture 18b, and an intermediate point between the genre picture 18a and its right-adjacent genre picture 18c. This definition will be used alike for each genre picture 18), the variable-diameter ring 23a and the fixed-diameter ring 23b are in a state of being deployed in a mutually concentric manner. If, however, the double-ring pointer 23 shifts from this central position, the variable-diameter ring 23a represents this genre-picture-18a's virtual area as a whole; whereas the fixed-diameter ring 23b indicates the relative position of the hand tip 24a within this virtual area in relation with the variable-diameter ring 23a. As is illustrated in FIG. 13A, the state where this fixed-diameter ring 23b is inscribed in the variable-diameter ring 23a indicates that the position of the hand tip 24a in the horizontal direction is positioned at the left-end boundary (i.e., the intermediate point between the genre picture 18a and its left-adjacent genre picture 18b) of the genre-picture-18a's virtual area.

Moreover, the position of the hand tip 24a in the horizontal direction displaces in the left direction further, then reaching the next genre-picture-18b's virtual area. At this time, as is illustrated in FIG. 13B, the fixed-diameter ring 23b is displayed at a position which is close to the right end of the variable-diameter ring 23a that represents the genre-picture-18b's virtual area.

In the case where the double-ring pointer 23 is caused to displace in the right direction from the genre picture 18a, its situation is also basically the same as the above-described situation.

FIG. 14A to FIG. 14D are diagrams for illustrating, in more detail, the concrete examples of the changes in the state of the double-ring pointer 23 illustrated in FIG. 13A and FIG. 13B. The reference numerals given here denote the following configuration components, respectively: 30 central-coordinate position of the genre picture 18, 31 inter-virtual-genre-pictures boundary line, 32 central point of the variable-diameter ring 23a, 33 central point of the fixed-diameter ring 23b. The overlapped explanation will be omitted by allocating the same reference numerals to the configuration components corresponding to the ones illustrated in the foregoing drawings.

Here, the fixed-diameter ring 23b indicates the position (i.e., X coordinate) of the hand tip 24a. The variable-diameter ring 23a suddenly changes in its position relationship with the fixed-diameter ring 23b at the boundary line of the genre-picture-18's virtual area. This fact shows that the variable-diameter ring 23a indicates the boundary line of a virtual area like this.

Figures 14A, 14B, 14C, 14D:
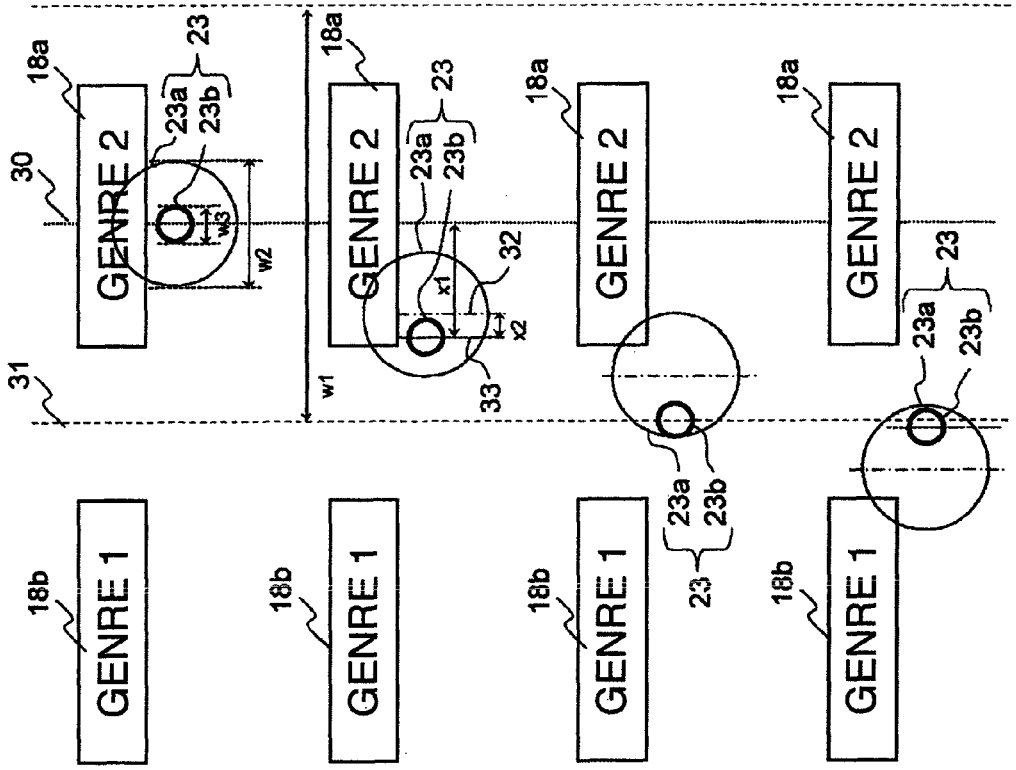
FIG. 14A to FIG. 14D are diagrams for illustrating, in more detail, a concrete example of the changes in the state of the double-ring pointer illustrated in FIG. 13A and FIG. 13B.

Namely, when the position of the hand tip 24a is the central-coordinate position 30 of the genre-picture-18a's virtual area, the variable-diameter ring 23a and the fixed-diameter ring 23b of the double-ring pointer 23 are in the mutually concentric relationship in which the central-coordinate position 30 is situated at its center. In the state like this, the user 24 changes the orientation of his or her hand into one direction (which, here, is assumed to be the left direction), thereby directing his or her hand tip 24a into the left direction. This operation causes the double-ring pointer 23 to displace in the left direction. FIG. 14B illustrates the state like this. The central point 33 of the fixed-diameter ring 23b represents the position of the hand tip 24a. In accompaniment with the displacement of the hand tip 24a, the variable-diameter ring 23a displaces in that direction (i.e., left direction). The relative position relationship of the variable-diameter ring 23a with the fixed-diameter ring 23b, however, changes in accompaniment with the displacement of the variable-diameter ring 23a. This situation shows that the hand tip 24a points at the inside of the genre-picture-18a's virtual area.

At this time, the position of the variable-diameter ring 23a (i.e., position of the central point 32 of the variable-diameter ring 23a) relative to the position of the hand tip 24a (i.e., position of the central point 33 of the fixed-diameter ring 23b) is set so that a distance X2 satisfies the following Expression (1):

$$W1:(W2-W3)=X1:X2 \qquad (1)$$

Here, the reference notations given in this Expression (1) denote the following data, respectively: X1: the distance ranging from the central-coordinate position 30 of the genre picture 18a to the central point 33 of the fixed-diameter ring 23b (i.e., position of the hand tip 24a), X2: the distance ranging from the central point 33 of the fixed-diameter ring 23b to the central point 32 of the variable-diameter ring 23a, W1: the width of the genre-picture-18a's virtual area (i.e., arrangement interval of the genre pictures 18), W2: the diameter of the variable-diameter ring 23a in the double-ring pointer 23, W3: the diameter of the fixed-diameter ring 23b therein. In other words, it turns out that, with respect to the distance X1 of the fixed-diameter ring 23b from the central-coordinate position 30 of the genre picture 18a due to the displacement of the hand tip 24a, the variable-diameter ring 23a displaces so that the distance X2 of the variable-diameter ring 23a from the central point 33 of the fixed-diameter ring 23b satisfies the relationship of the above-described Expression (1). Incidentally, when the hand tip 24a is positioned on the central-coordinate position 30 of the genre picture 18a, X1=X2=0 holds.

Moreover, when the position of the hand tip 24a reaches the boundary line of the genre-picture-18a's virtual area, i.e., the inter-virtual-genre-pictures boundary line 31, X1=W1/2 holds. Accordingly, based on the above-described Expression (1), X2 is determined as being X2=(W2−W3)/2. Consequently, it turns out that the variable-diameter ring 23a protrudes into the inside of the left-adjacent genre-picture-18b's virtual area from the inter-virtual-genre-pictures boundary line 31 by the amount of $$(W2/2) - X2 = (W2/2) - (W2 - W3)/2 = W3/2.$$

Furthermore, in this case, the central point 33 of the fixed-diameter ring 23b is positioned on the inter-virtual-genre-pictures boundary line 31 of the genre-picture-18a's and genre-picture-18b's virtual areas. As a result, it turns out that this fixed-diameter ring 23b also protrudes into the inside of the left-adjacent genre-picture-18b's virtual area from the inter-virtual-genre-pictures boundary line 31 by the amount of W3/2, i.e., the radius of the fixed-diameter ring 23b. From this condition, as is illustrated in FIG. 14C, the fixed-diameter ring 23b, whose central point 33 is positioned on the inter-virtual-genre-pictures boundary line 31, is in the state of being inscribed in the variable-diameter ring 23a.

In addition, the position of the hand tip 24a exceeds the inter-virtual-genre-pictures boundary line 31, then entering the inside of the genre-picture-18b's virtual area. At this time, the variable-diameter ring 23a displaces instantaneously into the left direction. As a result, as is illustrated in FIG. 14D, the fixed-diameter ring 23b, whose central point 33 is positioned on the left side of the inter-virtual-genre-pictures boundary line 31, falls into the state where the fixed-diameter ring 23b is displayed at the position which is close to the right end of the variable-diameter ring 23a. In this way, the position of the variable-diameter ring 23a changes suddenly into the same direction as the displacement direction of the hand tip 24a at the inter-virtual-genre-pictures boundary line 31. This fact shows that the position of the variable-diameter ring 23a has displaced from the genre-picture-18a's virtual area into the genre-picture-18b's virtual area adjacent thereto.

Furthermore, the hand tip 24a displaces in the left direction further from the state illustrated in FIG. 14D. At this time, the fixed-diameter ring 23b displaces in this left direction. In this case, it turns out that, when letting the distance ranging from the central-coordinate position 30 of the genre-picture-18a's virtual area to the central point 33 of the fixed-diameter ring 23b be X1, the variable-diameter ring 23a displaces so that the distance X2, which ranges from the central point 33 of the fixed-diameter ring 23b to the central point 32 of the variable-diameter ring 23a, satisfies the above-described Expression (1). Subsequently, when it comes to the state where the central point 33 of the fixed-diameter ring 23b coincides with the central-coordinate position of the genre picture 18b, the central point 32 of the variable-diameter ring 23a also coincides with this central-coordinate position. As a result, the variable-diameter ring 23a and the fixed-diameter ring 23b fall into the mutually concentric relationship.

Incidentally, in the case where the double-ring pointer 23 is caused to displace in the right direction from the state illustrated in FIG. 14A, its situation is also basically the same as the above-described one.

FIG. 15A to FIG. 15D are diagrams for illustrating, in more detail, the other concrete examples of the changes in the state of the double-ring pointer 23 illustrated in FIG. 13A and FIG. 13B. The overlapped explanation will be omitted by allocating the same reference numerals to the configuration components corresponding to the ones illustrated in FIG. 14A to FIG. 14D.

Here, the variable-diameter ring 23a indicates the position (i.e., X coordinate) of the hand tip 24a. Meanwhile, the fixed-diameter ring 23b, just like the variable-diameter ring 23a in FIG. 14A to FIG. 14D, indicates the boundary line of the genre-picture-18's virtual area.

Namely, when the position of the hand tip 24a is the central-coordinate position 30 of the genre-picture-18a's virtual area, as illustrated in FIG. 15A, the variable-diameter ring 23a and the fixed-diameter ring 23b of the double-ring pointer 23 are in the mutually concentric relationship in which the central-coordinate position 30 is situated at its center. This point is basically the same as the one illustrated in FIG. 14A to FIG. 14D.

In the state like this, the user 24 changes the orientation of his or her hand into one direction (which, here, is assumed to be the left direction), thereby directing his or her hand tip 24a into the left direction. This operation causes the double-ring pointer 23 to displace in the left direction. FIG. 15B illustrates the state this. Namely, the central point 32 of the variable-diameter ring 23a represents the position of the hand tip 24a. Meanwhile, the fixed-diameter ring 23b indicates that the position of the hand tip 24a is positioned on the genre-picture-18a's virtual area. Namely, this situation shows that, as compared with the case illustrated in FIG. 15A, the position of the hand tip 24a is displacing within the genre-picture-18a's virtual area.

At this time, the position of the fixed-diameter ring 23b (i.e., position of the central point 33 of the fixed-diameter ring 23b) relative to the position of the hand tip 24a (i.e., position of the central point 32 of the variable-diameter ring 23a) is set so that a distance X2 satisfies the above-described Expression (1), i.e., $$W1:(W2-W3)=X1:X2$$

Here, the reference notations given in this Expression (1) denote the following data, respectively: X1: the distance ranging from the central-coordinate position 30 of the genre picture 18a to the central point 32 of the variable-diameter ring 23a (i.e., position of the hand tip 24a), X2: the distance ranging from the central point 32 of the variable-diameter ring 23a to the central point 33 of the fixed-diameter ring 23b, W1: the width of the genre-picture-18a's virtual area (i.e., arrangement interval of the genre pictures 18), W2: the diameter of the variable-diameter ring 23a in the double-ring pointer 23, W3: the diameter of the fixed-diameter ring 23b therein. In other words, it turns out that, with respect to the distance X1 of the variable-diameter ring 23a from the central-coordinate position 30 of the genre picture 18a due to the displacement of the hand tip 24a, the fixed-diameter ring 23b displaces so that the distance X2 of the fixed-diameter ring 23b from the central point 32 of the variable-diameter ring 23a satisfies the relationship of the above-described Expression (1). Incidentally, when the hand tip 24a is positioned on the central-coordinate position 30 of the genre picture 18a, the central point 32 of the variable-diameter ring 23a and the central point 33 of the fixed-diameter ring 23b are positioned on the central-coordinate position 30 of the genre picture 18a. Accordingly, X1=X2=0 holds.

Moreover, when the position of the hand tip 24a reaches the boundary line of the genre-picture-18a's virtual area, i.e., the inter-virtual-genre-pictures boundary line 31, X1=W1/2 holds. Accordingly, based on the above-described Expression (1), the distance ranging from the inter-virtual-genre-pictures boundary line 31 to the central point 33 of the fixed-diameter ring 23b is determined as being X2=(W2−W3)/2. Since the radius of the fixed-diameter ring 23b is equal to W3/2, X2+W3/2=W2/2. From this condition, it turns out that, as is illustrated in FIG. 15C, the fixed-diameter ring 23b is in a state of being inscribed in the variable-diameter ring 23a whose central point 32 is positioned on this inter-vitural-genre-pictures boundary line 31.

In addition, the position of the hand tip 24a exceeds the inter-virtual-genre-pictures boundary line 31, then entering the inside of the genre-picture-18b's virtual area. At this time, the fixed-diameter ring 23b displaces instantaneously into the left direction. As a result, as is illustrated in FIG. 15D, the fixed-diameter ring 23b falls into the following state: Namely, in this state, the fixed-diameter ring 23b is displayed at a position which is close to the left end of the variable-diameter ring 23a whose central point 32 is positioned on the left side of the inter-virtual-genre-pictures boundary line 31. In this way, the position of the fixed-diameter ring 23b changes suddenly into the same direction as the displacement direction of the hand tip 24a at the inter-virtual-genre-pictures boundary line 31. This fact shows that the position of the hand tip 24a has displaced from the genre-picture-18a's virtual area into the genre-picture-18b's virtual area adjacent thereto. Consequently, the user 24 can confirm this displacement.

Furthermore, the hand tip 24a displaces in the left direction further from the state illustrated in FIG. 15D. At this time, the variable-diameter ring 23a displaces in this left direction. In this case, it turns out that, when letting the distance ranging from the central-coordinate position of the genre-picture-18b's virtual area to the central point 32 of the variable-diameter ring 23a be X1, the fixed-diameter ring 23b displaces so that the distance X2, which ranges from the central point 32 of the variable-diameter ring 23a to the central point 33 of the fixed-diameter ring 23b, satisfies the above-described Expression (1). Subsequently, when it comes to the state where the central point 32 of the variable-diameter ring 23a coincides with the central-coordinate position of the genre picture 18b, the central point 33 of the fixed-diameter ring 23b also coincides with this central-coordinate position. As a result, the variable-diameter ring 23a and the fixed-diameter ring 23b fall into the mutually concentric relationship.

Incidentally, in the case where the double-ring pointer 23 is caused to displace in the right direction from the state illustrated in FIG. 15A, its situation is also basically the same as the above-described one.

Figure 16:
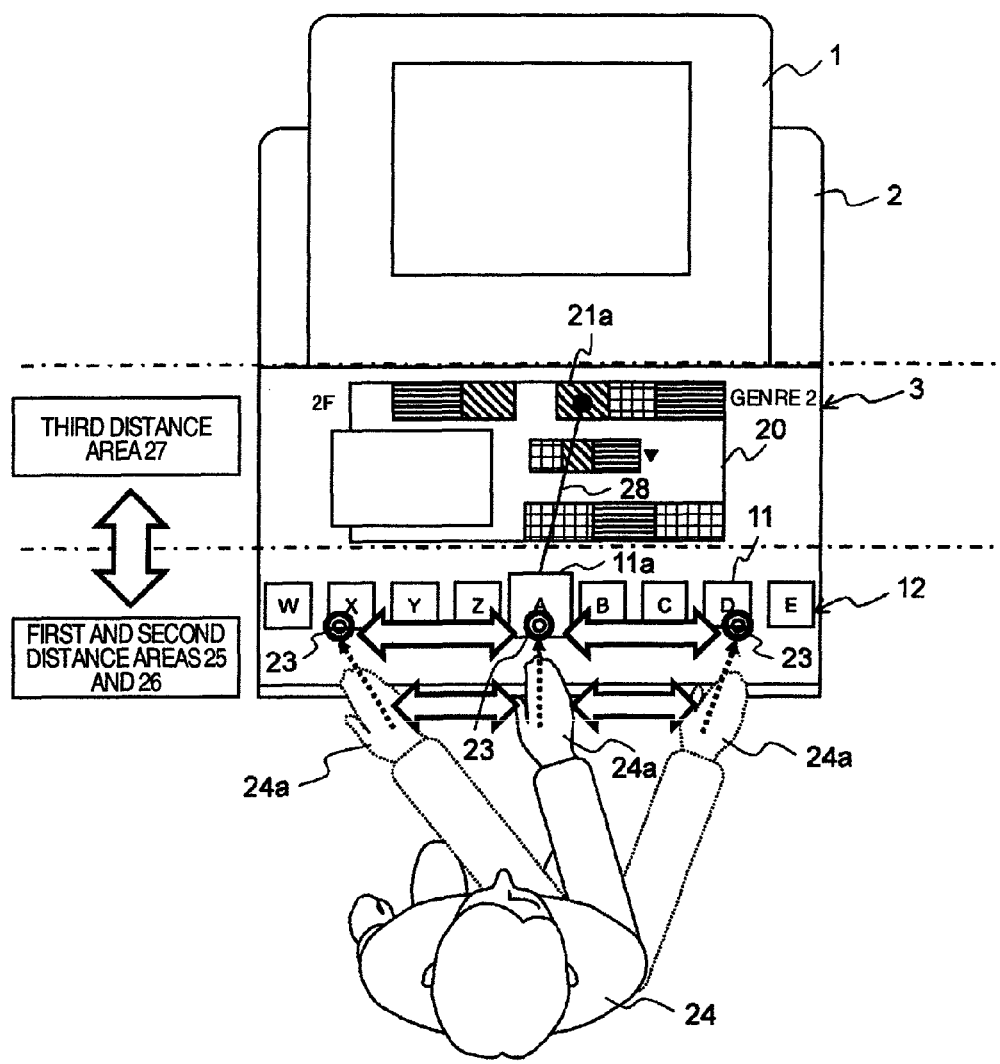
FIG. 16 is a diagram for illustrating a movement of the user's hand tip for displacing the double-ring pointer into the arrangement direction of the commodity pictures in the second hierarchy menu on the introduction picture illustrated in FIG. 9.

FIG. 16 is a diagram for illustrating a movement of the hand tip 24a of the user 24 for displacing the double-ring pointer 23 into the arrangement direction of the commodity pictures 11 in the second hierarchy menu 12 on the introduction picture 17a illustrated in FIG. 9. The reference numeral 11a denotes the commodity picture 11a. The overlapped explanation will be omitted by allocating the same reference numerals to the configuration components corresponding to the ones illustrated in the foregoing drawings.

On the above-described drawing, at present, the user 24 directs his or her hand tip 24a toward the front side of the screen within the second distance area 26. At this time, it is assumed that the double-ring pointer 23 is positioned on the commodity picture 11a of the commodity "A" on the front side in the second hierarchy menu (i.e., commodity-picture arrangement) 12. In this state, the user 24 directs his or her hand tip 24a onto the left side. This operation causes the double-ring pointer 23 to displace in the left direction, thereby allowing the pointer 23 to displace onto the commodity picture 11 of the commodity "Z" that is left-adjacent to the commodity picture 11a. Also, when the double-ring pointer 23 is positioned on the commodity picture 11a of the commodity "A", the user 24 directs his or her hand tip 24a onto the right side. This operation causes the double-ring pointer 23 to displace in the right direction, thereby allowing the pointer 23 to displace onto the commodity picture 11 of the commodity "B" that is right-adjacent to the commodity picture 11a.

In this way, merely changing the direction of the hand tip 24a allows the double-ring pointer 23 to displace in the arrangement direction of the commodity pictures 11 in the second hierarchy menu (i.e., commodity-picture arrangement) 12. This feature makes it possible to change the commodity picture 11 that is specified by the double-ring pointer 23.

Here, the hand tip 24a is positioned within the second distance area 26. Moreover, almost no distance is present between the hand tip 24a and the diffusion screen 3, which means that they are in a state of being in close proximity to each other. In the case like this, as illustrated in FIG. 16, the displacement distance of the hand tip 24a and the displacement distance of the double-ring pointer 23 become equal to each other. Accordingly, at the distance close to the diffusion screen 3, it becomes possible to select the second hierarchy menu (i.e., commodity-picture arrangement) 12 by causing the hand tip 24a to displace in much the same way as the displacement of the double-ring pointer 23. In the area close to the diffusion screen 3, the hand tip 24a and the second hierarchy menu (i.e., commodity-picture arrangement) 12 are close to each other. Consequently, it becomes easier to select a desired commodity picture 11 by permitting the double-ring pointer 23 to displace in such a manner that the pointer 23 follows the hand tip 24a.

Figure 17:
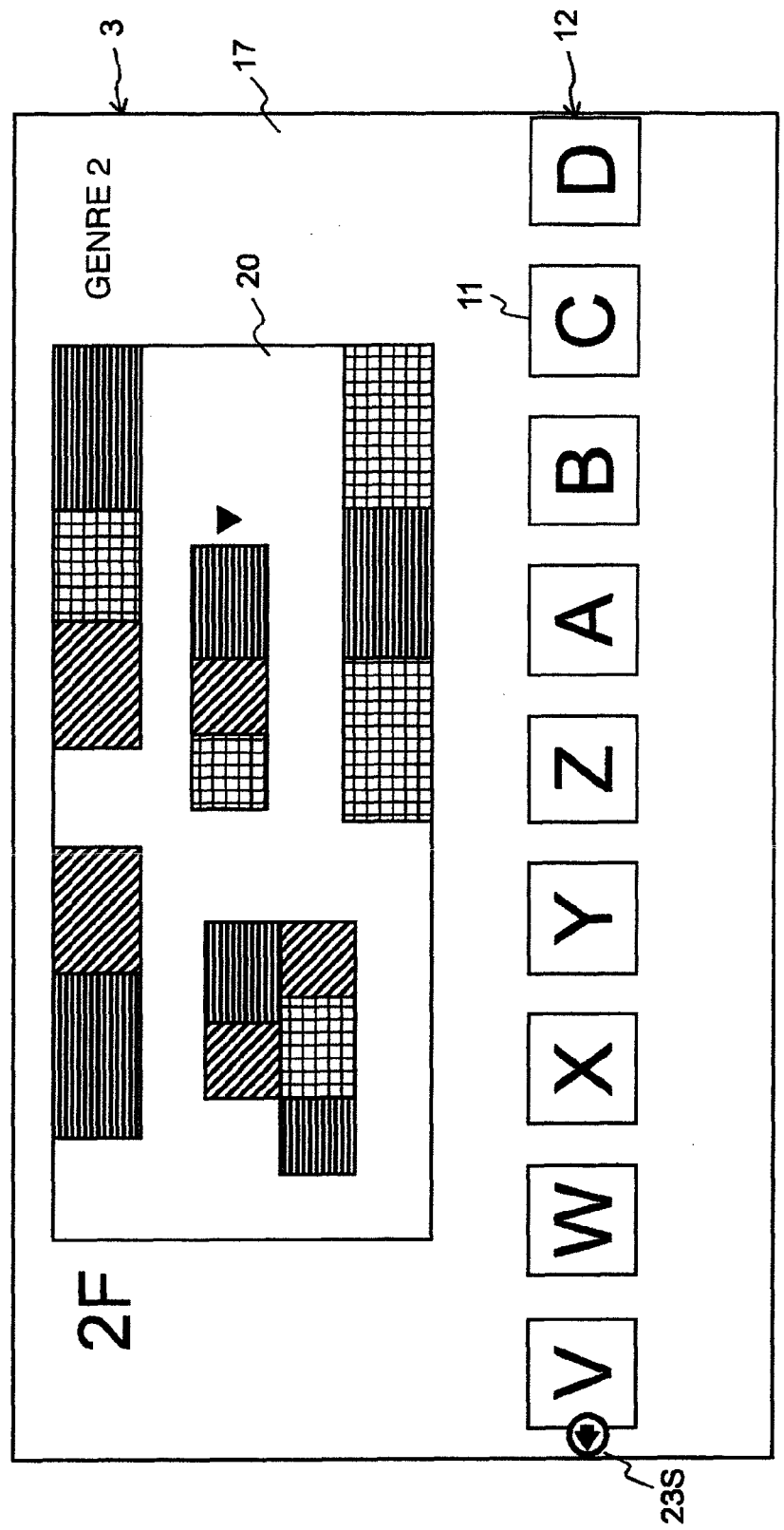
FIG. 17 is a diagram for illustrating the scroll state of the second hierarchy menu on the introduction picture illustrated in FIG. 16.

Incidentally, although not illustrated here, the double-ring pointer 23 is caused to be positioned at the left end of the second hierarchy menu (i.e., commodity-picture arrangement) 12 by directing the hand tip 24a onto the left side. Subsequently, the state like this is maintained during a predetermined time-interval. This operation transforms the double-ring pointer 23 into a scroll button 23S as is illustrated in FIG. 17, then causing this scroll button 23S to fall into a state of being operated. This scroll button's operation causes the second hierarchy menu (i.e., commodity-picture arrangement) 12 to be scrolled in the right direction, thereby allowing a new commodity picture 11 to appear from the left side. Conversely, the double-ring pointer 23 is caused to be positioned at the right end of the second hierarchy menu (i.e., commodity-picture arrangement) 12 during a predetermined time-interval by directing the hand tip 24a onto the right side. This operation causes the second hierarchy menu (i.e., commodity-picture arrangement) 12 to be scrolled in the left direction, thereby allowing a new commodity picture 11 to appear from the right side. In this way, merely changing the direction of the hand tip 24a causes the commodity pictures 11 to be scrolled, thereby making it possible to display a new commodity picture 11 which has been not displayed so far. As a result, it also becomes possible to display all of the commodity pictures 11 of the second hierarchy menu (i.e., commodity-picture arrangement) 12.

Also, on the display area of the second hierarchy menu (i.e., commodity-picture arrangement) 12 as well, as was described in the explanation in FIG. 14A to FIG. 14D, each genre's virtual area is set up on each genre basis. Accordingly, the commodities of the commodity pictures 11 within one and the same virtual area belong to one and the same genre. Furthermore, as is the case with the explanation in FIG. 14A to FIG. 14D and FIG. 15A to FIG. 15D, the position relationship between the variable-diameter ring 23a and the fixed-diameter ring 23b changes in accompaniment with the displacement of the double-ring pointer 23 within the same genre's virtual area. Namely, when the double-ring pointer 23 displaces from the one genre's virtual area into the adjacent genre's virtual area, the position relationship between the variable-diameter ring 23a and the fixed-diameter ring 23b changes suddenly in the double-ring pointer 23. This sudden change permits the user to confirm that the position of the double-ring pointer 23 has displaced from the one genre's virtual area into the different genre's virtual area whose genre is adjacent thereto.

Figure 18:
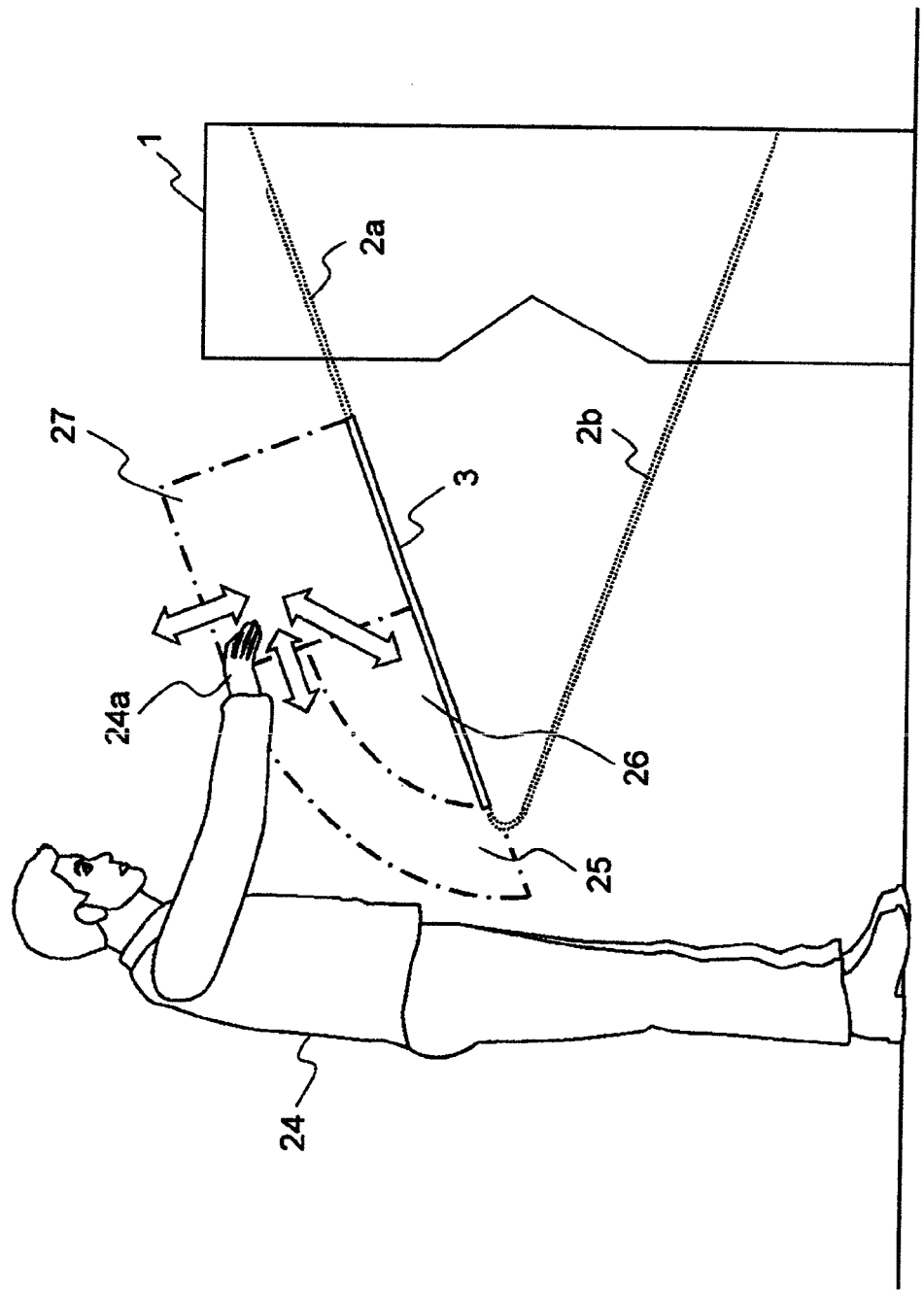
FIG. 18 is a diagram for illustrating a state where the user has inserted the user's hand tip into a third distance area.
Figure 19:
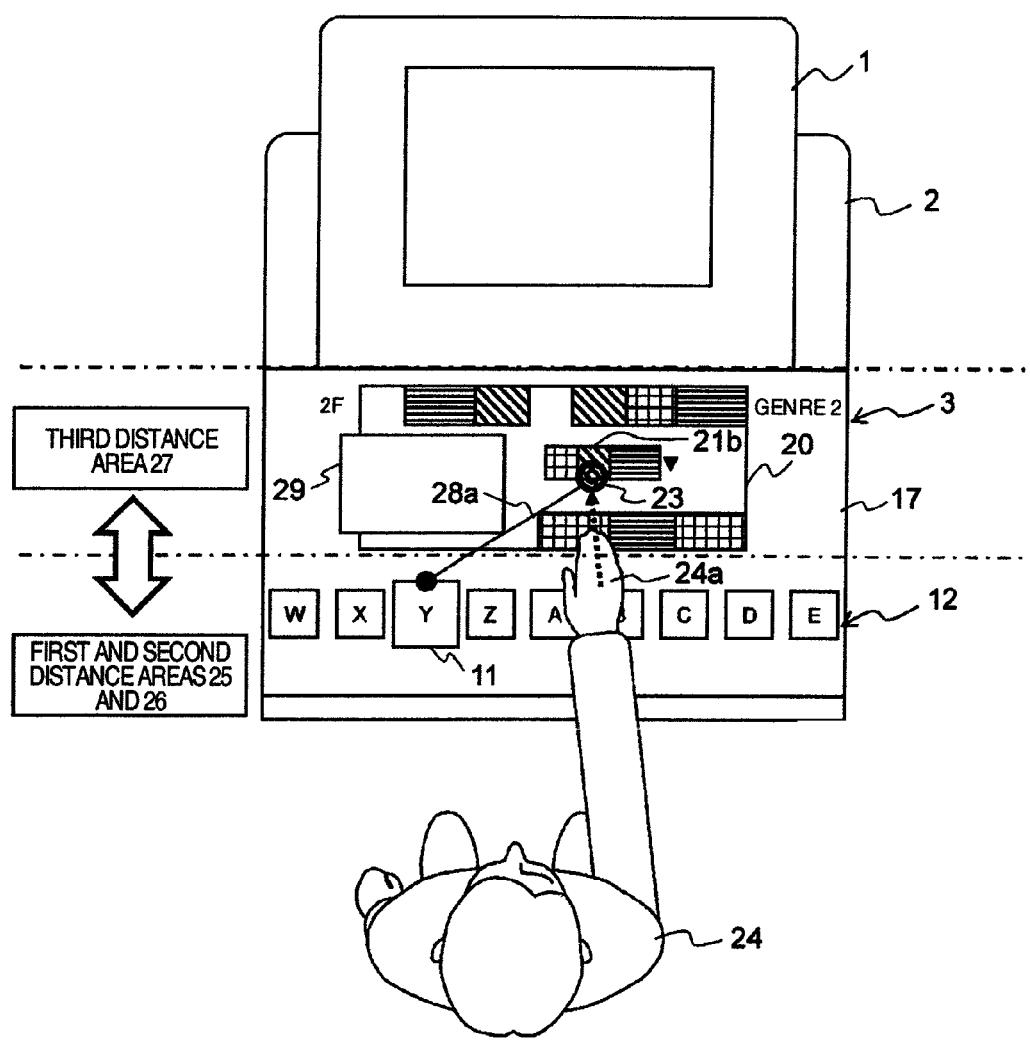
FIG. 19 is a diagram for illustrating a concrete example of the introduction picture displayed on the screen in the state illustrated in FIG. 18.

FIG. 18 is a diagram for illustrating the state where the user 24 has inserted the user's hand tip 24a into the third distance area 27. FIG. 19 is a diagram for illustrating a concrete example of the introduction picture 17 displayed on the diffusion screen 3 when the state like this is implemented. In FIG. 19, the reference numeral 28a given denotes the connection line. The overlapped explanation will be omitted by allocating the same reference numerals to the configuration components corresponding to the ones illustrated in the foregoing drawings.

In FIG. 19, when the hand tip 24a of the user 24 is positioned within the third distance area 27, the double-ring pointer 23 is displayed at a position which, within the map image 20 on the introduction picture 17, corresponds to the position and direction of the hand tip 24a within the third distance area 27. This display of the double-ring pointer 23 points at the sales counter 21b that exists at this position. Furthermore, in accompaniment therewith, the commodity picture 11 in the second hierarchy menu 12 of the commodity that is on sale at this sales counter 21b, and this sales counter 21b are displayed in a manner of being connected to each other by using the connection line 28a.

In this way, the sales counter within the map image 20 can be pointed at by using the position and direction of the hand tip 24a. Simultaneously, the commodity specified can be indicated by using the commodity picture 11 in the second hierarchy menu 12 via the connection line 28a.

FIG. 20 is a flowchart for illustrating processing steps of the picture display described so far.

On the above-described drawing, when it is judged that, based on the photographing signal transmitted from the video camera 4 (FIG. 1A to FIG. 1G), the user 24 is not positioned within a predetermined first distance (e.g., 3 meters) from the diffusion screen 3 (:"No" at step S101), the advertisement picture 10 illustrated in FIG. 3 is displayed on the diffusion screen 3 (: step S100). Moreover, it is detected that the user 24 enters the inside of this first distance (: "Yes" at step S101), the operation guidance picture 10a illustrated in FIG. 4 is displayed on the diffusion screen 3. This operation guidance picture 10a introduces the picture-utilizing method on the diffusion screen 3 (: step S102).

Next, it is detected that the user 24 proceeds in the direction of the diffusion screen 3, and that the user 24 has reached the inside of a second distance (e.g., 1 meter) from the diffusion screen 3 (: "Yes" at step S103), the introduction picture 17 illustrated in FIG. 5 is displayed. At this time, the double-ring pointer 23 is not displayed. Subsequently, the user 24 stretches the user's hand, thereby inserting the user's hand tip 24a into the inside of the first distance area 25. This operation makes it possible to display the double-ring pointer 23 on the first hierarchy menu 19 on the introduction picture 17 illustrated in FIG. 5 (: step S104). Furthermore, the hand tip 24a points at a single genre picture 18 in this first hierarchy menu 19 (: "Yes" at step S105). This operation makes it possible to display the introduction picture 17a illustrated in FIG. 9. Here, the first hierarchy menu 19 has disappeared from this introduction picture 17a, and the second hierarchy menu 12 is enlarged thereon. As a result, there occurs the state where the double-ring pointer 23 exists on a single commodity picture 11 in the second hierarchy menu 12 (: step S106).

In the state like this, the single commodity picture 11 in the second hierarchy menu 12 is pointed at by using this double-ring pointer 23 (: "Yes" at step S107). This operation makes it possible to display the introduction picture 17a illustrated in FIG. 9. Here, on this introduction picture 17a, this commodity picture 11, and the sales counter 21a within the map image 20 at which the commodity of this commodity picture 11 is on sale are connected to each other by using the connection line 28a (: step S108).

In addition, the double-ring pointer 23 is caused to be positioned at an end of the second hierarchy menu 12 during a predetermined time-interval (: "Yes" at step S109). As was explained in FIG. 17, this operation causes the second hierarchy menu 12 to be scrolled (: step S110).

As having been explained so far, this embodiment allows execution of the selection of an image in each menu 19 or 12, which is displayed on the screen in accordance with the position or direction of the hand tip 24a. Also, this embodiment allows execution of the search for the sales counter 21 within the map image 20.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus, comprising:
   a housing on which a display unit is provided, the display unit having a display screen displaying an introduction picture for introducing commodities;
   a sensor disposed at a position that is higher than the display screen, the sensor detecting a distance between a user and the display screen and detecting a direction and a position of a hand tip of the user directed toward the display screen; and
   a display control unit disposed at a position that is lower than the display screen, the display controlling unit controlling a display of content on the display screen, and
   wherein a portion of the display unit that includes the display screen protrudes from the housing and extends at a decline away from the housing toward a user-side of the display unit.

2. The image display apparatus according to claim 1, wherein said display screen is a screen onto which said introduction picture is projected by a projector, and wherein the display control unit is a projector.

3. The image display apparatus according to claim 2, wherein said introduction picture is so configured as to display thereon a first hierarchy menu, a second hierarchy menu, and a map image, said first hierarchy menu being a menu where genre pictures on each commodity-genre basis are displayed in a manner of being arranged, said second hierarchy menu being a menu where thumbnail-displayed commodity pictures are displayed in a manner of being arranged, said thumbnail-displayed commodity pictures indicating commodities on each commodity-genre basis in said first hierarchy menu, said map image being used for guiding said user around sales counters at which said commodities are on sale, said commodities being indicated by said commodity pictures in said second hierarchy menu, a pointer being displayed in any one of display areas of said first hierarchy and second hierarchy menus and display area of said map image in accordance with said sensor-detected detection position of said user's hand tip relative to said screen, so that any one of said genre pictures in said first hierarchy menu, said commodity pictures in said second hierarchy menu, and said sales counters on said map image can be pointed at by using said pointer.

4. The image display apparatus according to claim 3, wherein said pointer is positioned on said first hierarchy menu, when said sensor-detected detection position of said user's hand tip falls within a first distance range set in advance, said first hierarchy menu being deleted, and said second hierarchy menu being enlargement-displayed, and said pointer being positioned on said second hierarchy menu, when said sensor-detected detection position of said user's hand tip falls within a second distance range set in advance, said pointer being positioned on said map image, when said sensor-detected detection position of said user's hand tip falls within a third distance range set in advance.

5. The image display apparatus according to claim 4, wherein said commodity pictures in said second hierarchy menu are respectively displayed on said introduction picture in such a manner that said commodity pictures are respectively opposed to said genre picture of said genre to which said commodities belong, said introduction picture displaying thereon said first hierarchy menu, said second hierarchy menu, and said map image, said position of said pointer being fixed when said sensor-detected detection position of said user's hand tip displaces from said first distance range into said second distance range, said second hierarchy menu being then displayed in such a manner that said position-fixed pointer is positioned on said commodity picture in said second hierarchy menu, said commodity picture corresponding to said genre picture in said first hierarchy menu which has been displayed when said detection position falls within said first distance range.

6. The image display apparatus according to claim 5, wherein said commodity picture and said sales counter on said map image are displayed in a manner of being connected to each other by using a connection line, said commodity picture being pointed at by using said pointer in said second hierarchy menu, said commodity indicated by said commodity picture being on sale at said sales counter, said second hierarchy menu being displayed when said sensor-detected detection position of said user's hand tip falls within said second distance range.

7. The image display apparatus according to claim 3, wherein said first hierarchy menu is scrolled by positioning said pointer at an end portion of said arrangement of said genre pictures in said first hierarchy menu.

8. The image display apparatus according to claim 3, wherein said second hierarchy menu is scrolled by positioning said pointer at an end portion of said arrangement of said commodity pictures in said second hierarchy menu.

9. The image display apparatus according to claim 1, wherein the display control unit changes content to be displayed on the display screen when the distance between the user and the display screen that is detected by the sensor is within a first predetermined range of distances, and displays a pointer on the display screen when the distance between the user and the display screen that is detected by the sensor is within a second predetermined range of distances that is smaller than the distances of the first predetermined range.

* * * * *